US012782505B2

(12) United States Patent
Yorozuya et al.

(10) Patent No.: US 12,782,505 B2
(45) Date of Patent: Nov. 3, 2026

(54) POSITIONING DEVICE

(71) Applicant: Mitsubishi Electric Corporation, Tokyo (JP)

(72) Inventors: Tomoaki Yorozuya, Tokyo (JP); Yoshiki Takahashi, Tokyo (JP); Takeshi Amishima, Tokyo (JP); Ryuhei Takahashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 352 days.

(21) Appl. No.: 18/386,390

(22) Filed: Nov. 2, 2023

(65) Prior Publication Data

US 2024/0069156 A1 Feb. 29, 2024

Related U.S. Application Data

(63) Continuation of application No. PCT/JP2022/002083, filed on Jan. 21, 2022.

(30) Foreign Application Priority Data

Jun. 11, 2021 (WO) .................. PCT/JP2021/022231

(51) Int. Cl.
*G01S 7/38* (2006.01)
*G01S 5/06* (2006.01)
*G01S 5/12* (2006.01)

(52) U.S. Cl.
CPC .................. *G01S 7/38* (2013.01); *G01S 5/06* (2013.01); *G01S 5/12* (2013.01)

(58) Field of Classification Search
None
See application file for complete search history.

(56) References Cited

U.S. PATENT DOCUMENTS

2016/0299212 A1* 10/2016 Broad ........................ G01S 5/12
2017/0003376 A1* 1/2017 Wellman ................ H04K 3/822

FOREIGN PATENT DOCUMENTS

JP 8-262121 A 10/1996
JP 2009-198435 A 9/2009
JP 2011-247596 A 12/2011
(Continued)

OTHER PUBLICATIONS

Benvenuti, "Genetic Algorithms for PRI Ambiguity Resolution in Passive Emitter Tracking," Proceedings of the 6th European Radar Conference, Rome, Italy, Sep. 30-Oct. 2, 2009, pp. 117-120.
(Continued)

*Primary Examiner* — Whitney Moore
(74) *Attorney, Agent, or Firm* — Birch, Stewart, Kolasch & Birch, LLP

(57) ABSTRACT

A positioning device according to the present disclosure technology includes a TDOA calculator to calculate a TDOA on the basis of a peak of cross-correlation, a TDOA positioning processor to perform TDOA positioning on the basis of the TDOA, a DOA estimation processor to estimate a DOA from a reception signal received by an array antenna of at least one satellite, a DOA positioning processor to perform DOA positioning on the basis of the DOA, and an ambiguity handler to select one closest to a result calculated by the DOA positioning processor from a plurality of positioning results calculated by the TDOA positioning processor.

2 Claims, 24 Drawing Sheets

(56) References Cited

FOREIGN PATENT DOCUMENTS

| | | | |
|---|---|---|---|
| JP | 2012-83264 | A | 4/2012 |
| JP | 2013-2841 | A | 1/2013 |
| JP | 2013-29419 | A | 2/2013 |
| JP | 2014-44160 | A | 3/2014 |

OTHER PUBLICATIONS

Extended European Search Report for European Application No. 22819789.3, dated Oct. 10, 2024.
Li et al., “A Method to Eliminate TDOA Ambiguity Based on FDOA and FDOA-rate,” IEEE, 2015, 5 pages total.
Haworth et.al, “Interference Localization For Eutelsat Satellites—The First European Transmitter Location System,” International Journal of Satellite Communications, vol. 15, pp. 155-183, Sep. 1997.
International Search Report (PCT/ISA/210) issued in PCT/JP2021/022231, mailed on Jul. 13, 2021.
International Search Report (PCT/ISA/210) issued in PCT/JP2022/002083, mailed on Mar. 8, 2022.
Notice of Reasons for Refusal dated Oct. 7, 2021 in Japanese Patent Application No. 2021-549219.

* cited by examiner

POSITIONING DEVICE

CROSS REFERENCE TO RELATED APPLICATIONS

This application is a Continuation of PCT International Application No. PCT/JP2022/002083 filed on Jan. 21, 2022, which claims priority under 35 U.S.C. 119 (a) to PCT International Application No. PCT/JP2021/022231, filed in Japan on Jun. 11, 2021, all of which are hereby expressly incorporated by reference into the present application.

TECHNICAL FIELD

The present disclosure technology relates to a positioning device.

BACKGROUND ART

A technique for measuring a position of a radio wave source on the ground is disclosed. For example, Non Patent Literature 1 discloses a technique in which radio waves transmitted from a radio wave source whose position is unknown are received by a plurality of satellites, and positioning is performed on the basis of a time difference of arrival (hereinafter referred to as "TDOA") and a Doppler frequency (frequency difference of arrival, hereinafter referred to as "FDOA").

CITATION LIST

Non Patent Literature

Non Patent Literature 1: D. P. Haworth et al., Interference Localization For Eutelsat Satellites—The First European Transmitter Location System, International Journal of Satellite Communications, Vol. 15, 155-183, 1997

SUMMARY OF INVENTION

Technical Problem

In the positioning exemplified in Non Patent Literature 1, a pulse radar wave is used as a transmission wave of a positioning target. The pulse radar wave is inherently subject to ambiguity of TDOA and FDOA (both are hereinafter collectively referred to as "TDFD"). In positioning using a plurality of satellites, a plurality of positioning ambiguities occur, and thus positioning accuracy deteriorates.

An object of the present disclosure technology is to solve the above problem, and provides a positioning device capable of positioning a positioning target with high accuracy even when a pulse radar wave is used as a transmission wave of the positioning target.

Solution To Problem

A positioning device according to the present disclosure technology includes at least three receiving antennas, each of the receiving antennas receiving a different reception signal from a different satellite, a TDOA calculator to calculate a TDOA by referring to peaks of cross-correlations, the cross-correlations being calculated for all combinations to choose any two from the reception signals of the receiving antennas, a TDOA positioning processor to perform TDOA positioning by referring to the TDOA, a DOA estimation processor to estimate a DOA from a reception signal received by an array antenna of at least one satellite, a DOA positioning processor to perform DOA positioning by referring to the DOA, a TDOA range calculator to set a range of the TDOA by referring to a result of the DOA positioning processor, and an ambiguity handler to select one closest to the result calculated by the DOA positioning processor from a plurality of positioning results calculated by the TDOA positioning processor. The TDOA range calculator, by using a derived value from the DOA positioning as a reference value, sets a range of the TDOA with a TDOA-width being equal to or less than PRI, the PRI being Pulse-Repetition-Interval of a pulse radar wave of a transmission source as a positioning target.

Advantageous Effects of Invention

Since the positioning device according to the present disclosure technology has the above configuration, the ambiguity handling unit 8 selects the positioning point closest to the positioning point X calculated by the DOA positioning processing unit 7 from among the plurality of positioning points calculated by the TDOA positioning processing unit 5, and outputs a positioning result with the selected value as the most likely positioning point p. With this operation, the positioning device according to the present disclosure technology can position the positioning target with high accuracy even when a pulse radar wave is used as a transmission wave of the positioning target.

BRIEF DESCRIPTION OF DRAWINGS

FIG. 21 (either of FIG. 21A and FIG. 21B) is a graph plotting positioning points in a TDOA-FDOA space.

FIG. 22 (either of FIG. 22A and FIG. 22B) is a plot on a map comparing a variation in positioning by DOA and a variation in positioning by TDFD.

DESCRIPTION OF EMBODIMENTS

Operation of a positioning device according to the present disclosure technology will be apparent from the following description of positioning the position of a radio wave source using three satellites.

Figure 1:
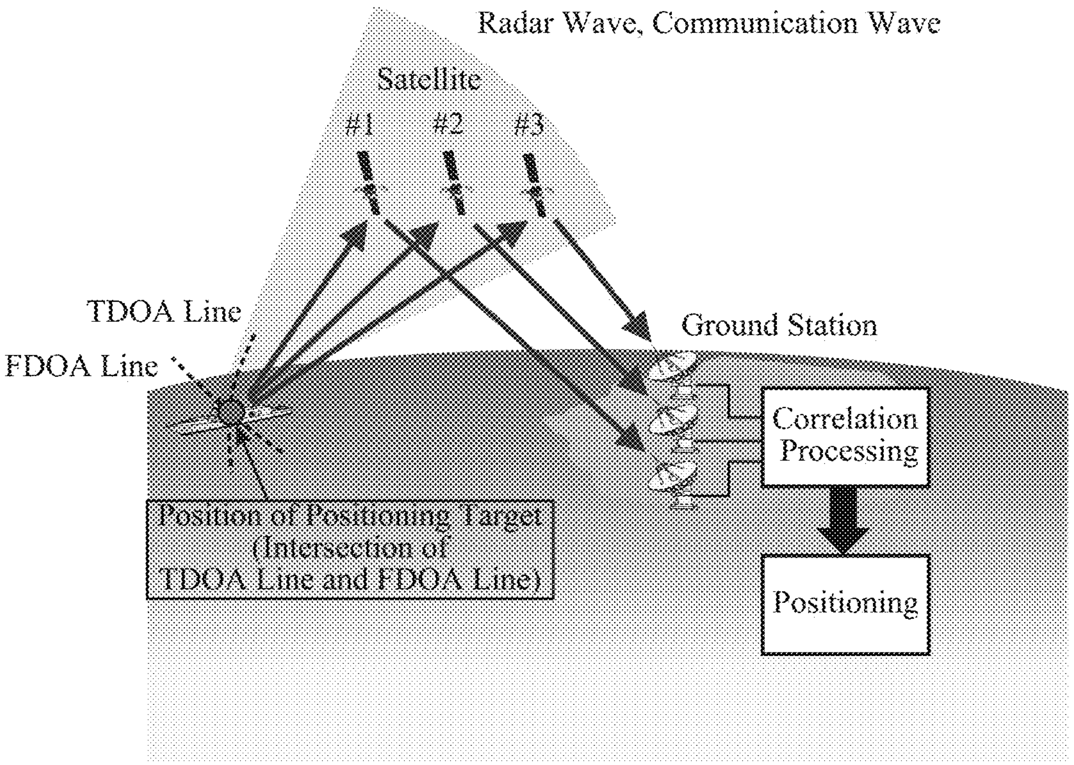
FIG. 1 is a conceptual diagram illustrating a concept of positioning.

FIG. 1 is a conceptual diagram illustrating a concept of positioning. As illustrated in FIG. 1, the positioning device performs correlation processing on reception signals from a plurality of satellites. The positioning device illustrated in FIG. 1 performs two-dimensional correlation calculation on, for example, a reception signal from satellite #1 and a reception signal from satellite #2. The two-dimensional correlation calculation is also performed on the reception signal from satellite #2 and a reception signal from satellite #.

The positioning of the positioning device illustrated in FIG. 1 is calculated on the basis of a result of correlation processing. First, the positioning device illustrated in FIG. 1 calculates a TDFD from the peak of the two-dimensional correlation calculation. The positioning point is obtained from the calculated TDFD.

The following is an expression for calculating the TDFD using the reception signals from satellites #1 and #2.

$$TDOA_{12} = \frac{1}{c}\|p - p_{s1}\| - \frac{1}{c}\|p - p_{s2}\| \tag{1}$$

$$FDOA_{12} = \frac{1}{\lambda}\frac{v_{s1}^T(p - p_{s1})}{\|p - p_{s1}\|} - \frac{1}{\lambda}\frac{v_{s2}^T(p - p_{s2})}{\|p - p_{s2}\|} \tag{2}$$

Expression (1) is an expression for calculating the TDOA from the reception signals from the satellites #1 and #2. The subscript "12" indicates a calculation result using the information from the satellites #1 and #2. p is a three-dimensional position vector of a positioning target. $p_{si}$ (i=1, 2, 3) is a three-dimensional position vector for the i-th satellite. c represents the speed of light. In addition, λ represents a transmission wavelength of the positioning target.

Expression (2) is an expression for calculating the FDOA from the reception signals from the satellites #1 and #2. $v_{si}$ (i=1, 2, 3) is a three-dimensional velocity vector for the i-th satellite. The superscript T represents transposition of interchanging rows and columns.

The following is an expression for calculating the TDFD using the reception signals from the satellites #2 and #3.

$$TDOA_{23} = \frac{1}{c}\|p - p_{s2}\| - \frac{1}{c}\|p - p_{s3}\| \tag{3}$$

$$FDOA_{23} = \frac{1}{\lambda}\frac{v_{s2}^T(p - p_{s2})}{\|p - p_{s2}\|} - \frac{1}{\lambda}\frac{v_{s3}^T(p - p_{s3})}{\|p - p_{s3}\|} \tag{4}$$

Expression (3) is an expression for calculating the TDOA from the reception signals from satellites #2 and #3. In addition, Expression (4) is an expression for calculating the FDOA from the reception signals from the satellites #2 and #3. A subscript "23" indicates a calculation result using the information from the satellites #2 and #3.

The following is a constraint condition that the positioning target is on the ground surface.

$$R_E = \|p - p_E\| \tag{5}$$

$R_E$ indicates the radius of the earth. The $P_E$ is a three-dimensional position vector about the center of the earth.

Positioning of the position of the radio wave source is performed by solving simultaneous equations expressed by Expressions (1) to (5). Since Expressions (1) to (5) are nonlinear equations, the simultaneous equations are obtained numerically, not analytically. As a numerical solution of the simultaneous equations, a Newton method, a successive approximation method, or the like may be used.

In order to improve the visibility of the numerical solution, it is considered that the right sides of Expressions (1) to (5) are functions for the three-dimensional position vector p for the positioning target. The following are functions related to Expressions (1) to (5).

$$f_{12}(p) := \|p - p_{s1}\| - \|p - p_{s2}\| \tag{6}$$

$$f_{23}(p) := \|p - p_{s2}\| - \|p - p_{s3}\| \tag{7}$$

$$g_{12}(p) := \frac{v_{s1}^T(p - p_{s1})}{\|p - p_{s1}\|} - \frac{v_{s2}^T(p - p_{s2})}{\|p - p_{s2}\|} \tag{8}$$

$$g_{23}(p) := \frac{v_{s2}^T(p - p_{s2})}{\|p - p_{s2}\|} - \frac{v_{s3}^T(p - p_{s3})}{\|p - p_{s3}\|} \tag{9}$$

$$h(p) := \|p - p_E\| \tag{10}$$

Expressions (6) to (10) are partially differentiated by the three-dimensional position vector p of the positioning target.

$$\nabla_p f_{12} = \frac{(p - p_{s1})}{\|p - p_{s1}\|} - \frac{(p - p_{s2})}{\|p - p_{s2}\|} \tag{11}$$

$$\nabla_p f_{23} = \frac{(p - p_{s2})}{\|p - p_{s2}\|} - \frac{(p - p_{s3})}{\|p - p_{s3}\|} \tag{12}$$

$$\nabla_p g_{12} = \frac{v_{s1}}{\|p - p_{s1}\|} - \frac{v_{s1}^T(p - p_{s1})}{\|p - p_{s1}\|}(p - p_{s1}) - \frac{v_{s2}}{\|p - p_{s2}\|} - \frac{v_{s2}^T(p - p_{s2})}{\|p - p_{s2}\|}(p - p_{s2}) \tag{13}$$

$$\nabla_p g_{23} = \frac{v_{s2}}{\|p - p_{s2}\|} - \frac{v_{s2}^T(p - p_{s2})}{\|p - p_{s2}\|}(p - p_{s2}) - \frac{v_{s3}}{\|p - p_{s3}\|} - \frac{v_{s3}^T(p - p_{s3})}{\|p - p_{s3}\|}(p - p_{s3}) \tag{14}$$

$$\nabla_p h = \frac{p - p_E}{\|p - p_E\|} \tag{15}$$

The numerical solution of the three-dimensional position vector p for the positioning target may be obtained, for example, by iteratively performing the following calculation.

$$p = p + A^{-1}\Delta u \tag{16}$$

Here, A is a matrix represented by the following expression.

$$A = \begin{bmatrix} \nabla_p f_{12}^T \\ \nabla_p f_{23}^T \\ \nabla_p g_{12}^T \\ \nabla_p g_{23}^T \\ \nabla_p h^T \end{bmatrix} \tag{17}$$

In addition, Δu is a vector expressed by the following expression.

$$\Delta u = \begin{bmatrix} c \cdot TDOA_{12} - f_{12} \\ c \cdot TDOA_{23} - f_{23} \\ \lambda \cdot FDOA_{12} - g_{12} \\ \lambda \cdot FDOA_{23} - g_{23} \\ R_E - h \end{bmatrix} \tag{18}$$

A stop condition of the repetitive expression (16) may be, for example, that $|A^{-1}\Delta u|$ of the expression (16) becomes sufficiently small and is smaller than a predetermined threshold. In addition, the stop condition may be a condition that determines the upper limit of the number of iterative calculations and determines whether the number of iterations exceeds the upper limit.

First Embodiment

Figure 2:
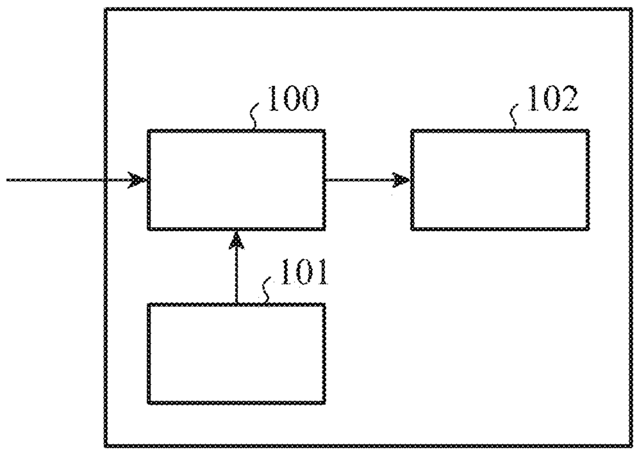
FIG. 2 is a hardware configuration diagram in a case where a part of a positioning device according to the present disclosure technology is implemented by a program executed on a processor.

FIG. 2 is a hardware configuration diagram in a case where a part of the positioning device according to the present disclosure technology is implemented by a program executed on a processor. As illustrated in FIG. 2, the function of a positioning device according to a first embodiment may be implemented by software, firmware, or a combination of software and firmware. Software and firmware are described as programs and stored in the memory 101. A processor 100 implements the functions of the respective units by reading and executing the programs stored in the memory 101. That is, it can be said that this program causes a computer to execute the function of the positioning device according to the present disclosure technology. Here, the memory 101 may be, for example, a nonvolatile or volatile semiconductor memory such as a RAM, a ROM, a flash memory, an EPROM, or an EEPROM. Furthermore, the memory 101 may be a magnetic disk, a flexible disk, an optical disk, a compact disk, a mini disk, a DVD, or the like.

The function of the positioning device according to the first embodiment may be implemented by dedicated hardware. The hardware for implementing the function may be a processing circuit. The processing circuit may be, for example, a single circuit, a composite circuit, a programmed processor, a parallel programmed processor, an ASIC, an FPGA, or a combination thereof.

The processor 100 illustrated in FIG. 2 performs correlation processing. The correlation processing is, in other words, calculation of cross-correlation. Specifically, the processor 100 calculates TDOA generated when a plurality of satellites pass, and performs positioning. In addition, the processor 100 estimates the DOA from the reception signal received by an array antenna of one satellite, and performs positioning. Here, DOA is an acronym for Direction of Arrival, and means a direction of arrival. The positioning device according to the first embodiment can resolve the positioning ambiguity on the basis of the ambiguity of the TDOA by using the information of the positioning point estimated by the DOA.

Figure 3:
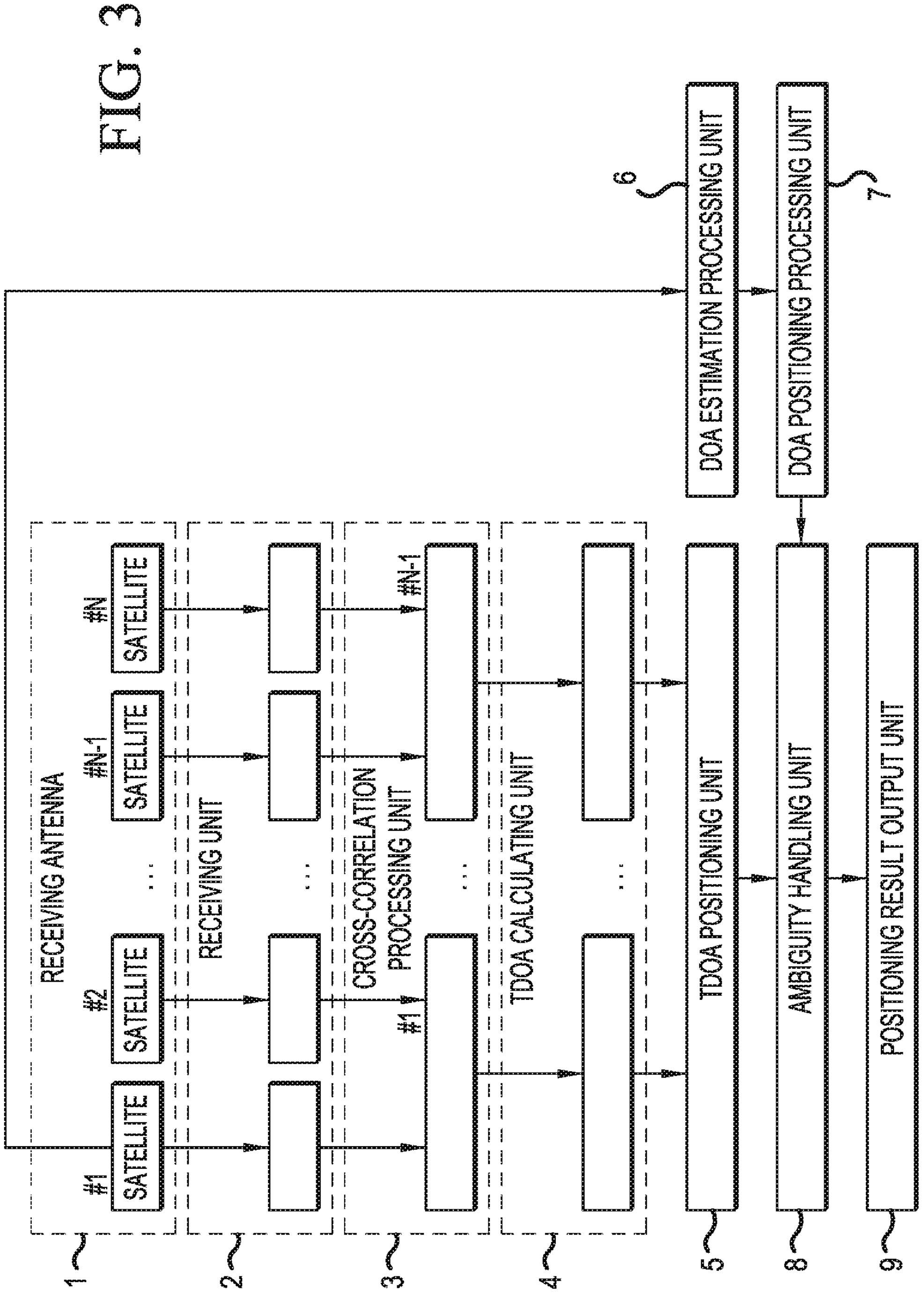
FIG. 3 is a functional block diagram illustrating a configuration of the positioning device according to a first embodiment.

FIG. 3 is a functional block diagram illustrating a configuration of the positioning device according to the first embodiment. As illustrated in FIG. 3, the positioning device according to the first embodiment includes functional blocks of a receiving antenna 1, a receiving unit 2, a cross-correlation processing unit 3, a TDOA calculating unit 4, a TDOA positioning processing unit 5, a DOA estimation processing unit 6, a DOA positioning processing unit 7, an ambiguity handling unit 8, and a positioning result output unit 9.

Figure 4:
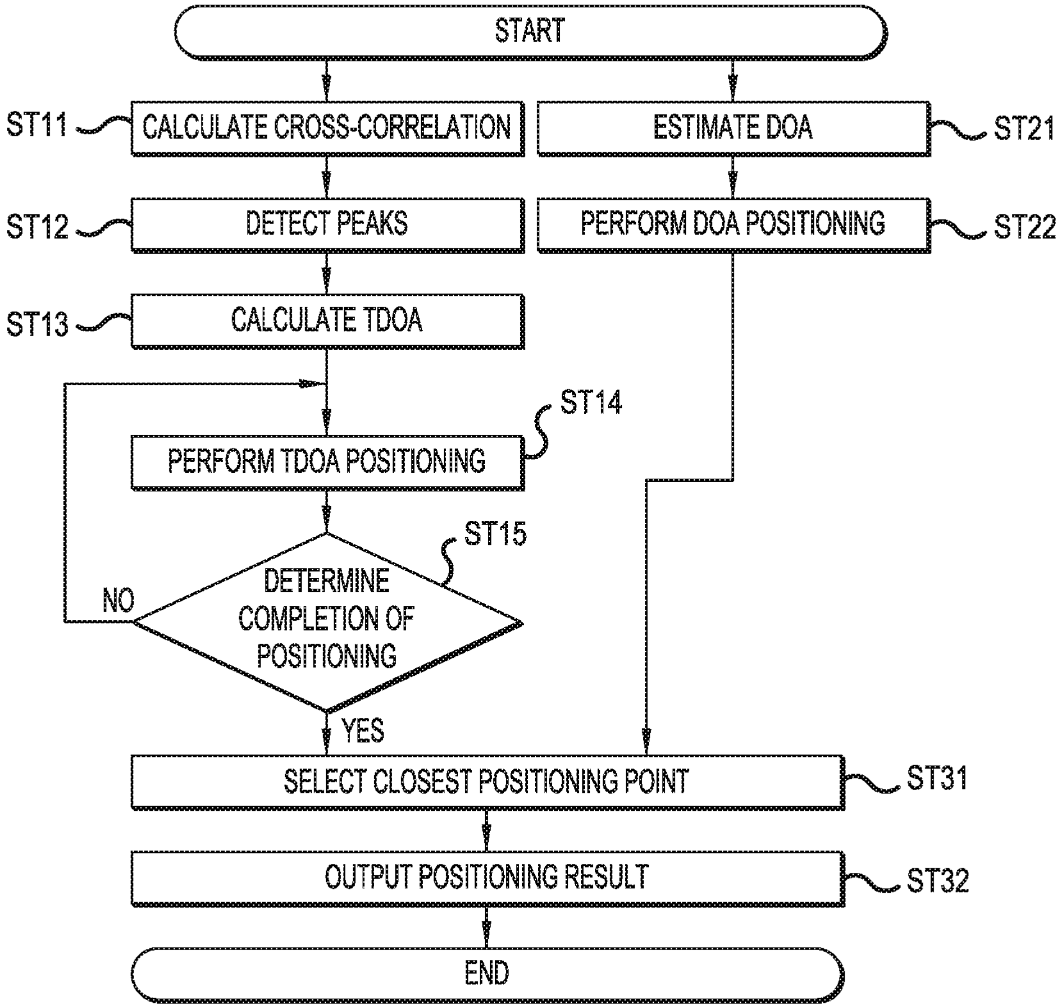
FIG. 4 is a flowchart illustrating a processing flow of the positioning device according to the first embodiment.

FIG. 4 is a flowchart illustrating a processing flow of the positioning device according to the first embodiment. As illustrated in FIG. 4, the processing of the positioning device according to the first embodiment is roughly divided into three parts. The first part includes processing steps related to TDOA. The processing steps related to TDOA include a step (ST11) of calculating cross-correlation, a step (ST12) of detecting peaks, a step (ST13) of calculating TDOA, a step (ST14) of performing TDOA positioning, and a step (ST15) determining completion of positioning. The second part is a processing step related to DOA. The processing steps related to DOA include a step (ST21) of estimating the DOA and a step (ST22) of performing DOA positioning. The third part is a processing step utilizing the TDOA result and the DOA result. The processing steps here include a step (ST31) of selecting a closest positioning point and a step (ST32) of outputting a positioning result.

The cross-correlation processing unit 3 performs the step (ST11) of calculating cross-correlation. For example, in a case where the position of the radio wave source is measured by three satellites, the cross-correlation processing unit 3 performs the two-dimensional correlation calculation on the reception signal from the satellite #1 and the reception signal from the satellite #2. Similarly, the two-dimensional correlation calculation is also performed on the reception signal from satellite #2 and the reception signal from satellite #3.

In a case where the position of the radio wave source is measured using more than three satellites, the cross-correlation processing unit 3 may perform the two-dimensional correlation calculation in all combinations or may perform the two-dimensional correlation calculation in some combinations.

The two-dimensional correlation calculation may use a cross-correlation function obtained by flipping the order of a signal array of one of convolution expressions for convoluting two signals. Specifically, the two-dimensional correlation function may be expressed by the following Expression.

$$C(\tau, f) = \int_{t=0}^{t=T} s_1(t) s_2^*(t-\tau) e^{-j2\pi ft} dt \tag{19}$$

The TDOA calculating unit 4 performs the step (ST12) of detecting a peak for the output of the cross-correlation. When the transmission wave of the positioning target is a pulse radar wave, a plurality of peaks occur in the output of the cross-correlation. This plurality of peaks means that the ambiguity of TDOA occurs for each PRI. Here, PRI is an abbreviation of Pulse Repetition Interval, and represents a pulse repetition time of a pulse radar wave.

The TDOA calculating unit 4 performs the step (ST13) of calculating the TDOA on the basis of the detected peak.

The TDOA positioning processing unit 5 performs TDOA positioning on the basis of the calculated TDOA (step indicated by ST14 in FIG. 4). For example, in a case where the position of the radio wave source is measured by three satellites, the TDOA positioning processing unit 5 repeatedly performs the following calculation.

$$p_k = p_k + A_k^{-1} \Delta u_k t \tag{20}$$

However, the subscript k (k=1, 2, . . . K) is for distinguishing the ambiguity of TDOA. K is the total number of ambiguities of the TDOA.

The above $A_k$ is a matrix represented by the following expression.

$$A_k = \begin{bmatrix} \nabla_p f_{12}^T \\ \nabla_p f_{23}^T \\ \nabla_p h^T \end{bmatrix} \tag{21}$$

The above $\Delta u_k$ is a vector expressed by the following expression.

$$\Delta u_k = \begin{bmatrix} c\ TDOA_{12_k} - f_{12} \\ c\ TDOA_{23_k} - f_{23} \\ R_E - h \end{bmatrix} \tag{22}$$

The stop condition of the repetitive expression (20) may be, for example, that $|A_k^{-1}\Delta u_k|$ of the expression (20) becomes sufficiently small and is smaller than a predetermined threshold. In addition, the stop condition may be a condition that determines the upper limit of the number of iterative calculations and determines whether the number of iterations exceeds the upper limit.

The DOA estimation processing unit 6 performs the step (ST21) of estimating a DOA. Specifically, the DOA estimation processing unit 6 estimates the DOA from the reception signal received by the array antenna of one satellite. As a method of estimating the DOA that is the direction of the radio wave source using the array antenna, a beamforming method or the like can be considered.

The DOA positioning processing unit 7 performs DOA positioning on the basis of the estimated DOA (step indicated by ST22 in FIG. 4). In order to distinguish from TDOA positioning, a vector x is used as a position of a positioning target obtained by DOA positioning. The following is an expression representing a true value of the position of the positioning target.

$$\chi = (Lon, Lat)^T \tag{23}$$

Here, LON represents longitude, and LAT represents latitude. The vector x may be obtained by a least squares method or the like.

The processing performed by the DOA positioning processing unit 7 results in solving a problem expressed by the following mathematical expression.

$$\text{find } \chi \text{ s.t. } \arg\min_{\chi} J(\chi, p_{sat}) \tag{24}$$

Here, $P_{sat}$ is a three-dimensional position vector of the satellite that estimates the DOA. J is an evaluation function using x and $P_{sat}$ as arguments. The evaluation function is also referred to as a cost function. The processing performed by the DOA positioning processing unit 7 results in obtaining the vector x that minimizes the evaluation function J.

In order to obtain the vector x that minimizes the evaluation function J, the DOA positioning processing unit 7 performs an iterative calculation described below.

$$G(\chi, p_{sat}) = \begin{pmatrix} \nabla_\chi Az(\chi, p_{sat})^T \\ \nabla_\chi El(\chi, p_{sat})^T \end{pmatrix} \tag{25}$$

$$G(\hat{\chi}_m, p_{sat}) = G(\chi, p_{sat})|_{\chi=\hat{\chi}_m} \tag{26}$$

$$\Delta\hat{\chi}_m = \left(G^T(\hat{\chi}_m, p_{sat}) R^{-1} G(\hat{\chi}_m, p_{sat})\right)^{-1} \times G^T(\hat{\chi}_m, p_{sat}) R^{-1} (z - h(\hat{\chi}_m, p_{sat})) \tag{27}$$

$$\hat{\chi}_{m+1} = \Delta\hat{\chi}_m + \hat{\chi}_m \tag{28}$$

Here, Az is an abbreviation of Azimuth and represents an azimuth angle, and El is an abbreviation of Elevation and represents an elevation angle. The matrix R on the right side of Expression (27) is an error covariance matrix of DOA.

$$R = \begin{bmatrix} \sigma_{Az} & 0 \\ 0 & \sigma_{El} \end{bmatrix} \tag{29}$$

$\sigma_{Az}$: standard deviation of Azimuth angle $\sigma_{El}$: standard deviation of Elevation angle Further, the function h on the right side of the Expression (27) is a vector including the Az measured angle value and the El measured angle value. Furthermore, the vector z on the right side of Expression (27) is an observation vector including the Az measured angle value and the El measured angle value to which the additive noise n is applied. That is, the following term on the right side of Expression (27) calculates the noise n.

$$z - h(\hat{\chi}_m, p_{sat}) = n \tag{30}$$

The DOA positioning processing unit 7 may use a convergence end determination condition described below to determine whether the iterative calculation result has converged to a value to be properly obtained.

$$\frac{\|\Delta\hat{\chi}_m\|}{\|\hat{\chi}_m\|} < \varepsilon \text{ and } m < Itr\text{max} \tag{31}$$

Here, ε is a threshold for residual, m is the number of iterative calculations, and Itrmax is the maximum number of iterative calculations. When m exceeds Itrmax, the DOA positioning processing unit 7 may forcibly terminate the iterative calculation assuming that the iterative calculation has not converged to the solution.

The expression of partial differentiation expressed in Expression (25) can be modified as follows.

$$G(X, p_{sat}) = F(p, p_{sat})E^T(X_t) \tag{32}$$

Here, F and E on the right side of Expression (32) are as follows.

$$F(p, p_{sat}) = (\nabla_p Az \quad \nabla_p El)^T \tag{33}$$

$$E(\chi) = \left(\left(\frac{p}{\partial Lon}\right)\left(\frac{p}{\partial Lat}\right)\right)^T \tag{34}$$

The ambiguity handling unit 8 selects, from among a plurality of positioning points calculated by the TDOA positioning processing unit 5, a positioning point closest to the positioning point X calculated by the DOA positioning processing unit 7, and outputs a positioning result with the selected value as a most likely positioning point p.

$$p = \underset{p_k}{\arg\min}\|p_k - \chi\| \tag{35}$$

Here, the subscript k is used to distinguish the ambiguity of the TDOA. If the total number of ambiguities of the TDOA is K, k is used from 1 to K. In addition, the symbol //*// represents a norm here. The norm here has no problem as Euclidean norm.

Since the positioning device according to the first embodiment has the above configuration, the ambiguity handling unit 8 selects the positioning point closest to the positioning point X calculated by the DOA positioning processing unit 7 from among the plurality of positioning points calculated by the TDOA positioning processing unit 5, and outputs a positioning result with the selected value as the most likely positioning point p. With this operation, the positioning device according to the present disclosure technology has an effect of positioning the positioning target with high accuracy even when a pulse radar wave is used as a transmission wave of the positioning target.

Second Embodiment

In the first embodiment, as one aspect of the present disclosure technology, a DOA is estimated by one satellite. A second embodiment illustrates that a DOA is estimated by a plurality of satellites as another aspect of the present disclosure technology. In the second embodiment, the same reference numerals as those of the components used in the first embodiment are used unless otherwise specified. In the second embodiment, the description overlapping with the first embodiment is appropriately omitted.

A part of a positioning device according to the second embodiment can be implemented by a program executed on the processor 100. The hardware configuration in this case is as illustrated in FIG. 2. The positioning device according to the second embodiment estimates the DOA, not just for information coming from one satellite as described in the first embodiment, but for each information coming from different satellites. The positioning device according to the second embodiment may calculate the centroid of the obtained plurality of positioning points, and use the calculated centroid value to replace the DOA estimation value by one satellite illustrated in the first embodiment.

Figure 5:
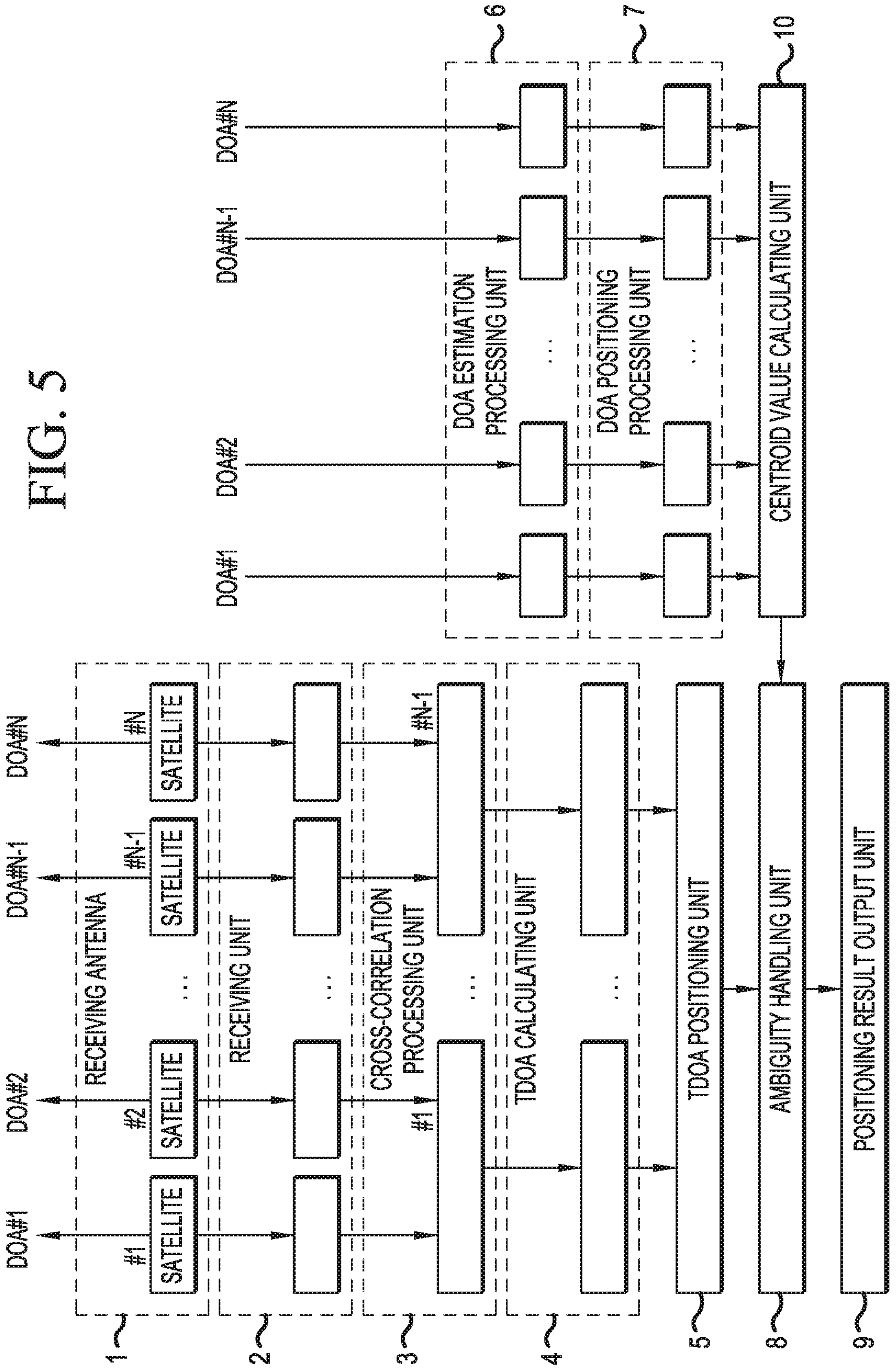
FIG. 5 is a functional block diagram illustrating a configuration of a positioning device according to a second embodiment.

FIG. 5 is a functional block diagram illustrating a configuration of the positioning device according to the second embodiment. As illustrated in FIG. 5, the positioning device according to the second embodiment includes a functional block of a centroid value calculating unit 10 in addition to the functional blocks described in the first embodiment. Furthermore, as illustrated in FIG. 5, in the positioning device according to the second embodiment, assuming that the number of satellites, that is, the number of receiving antennas is N, the DOA estimation processing unit 6 performs N independent processes corresponding to the respective receiving antennas. As does the DOA estimation processing unit 6, the DOA positioning processing unit 7 also performs N pieces of independent processing corresponding to the respective receiving antennas.

Figure 6:
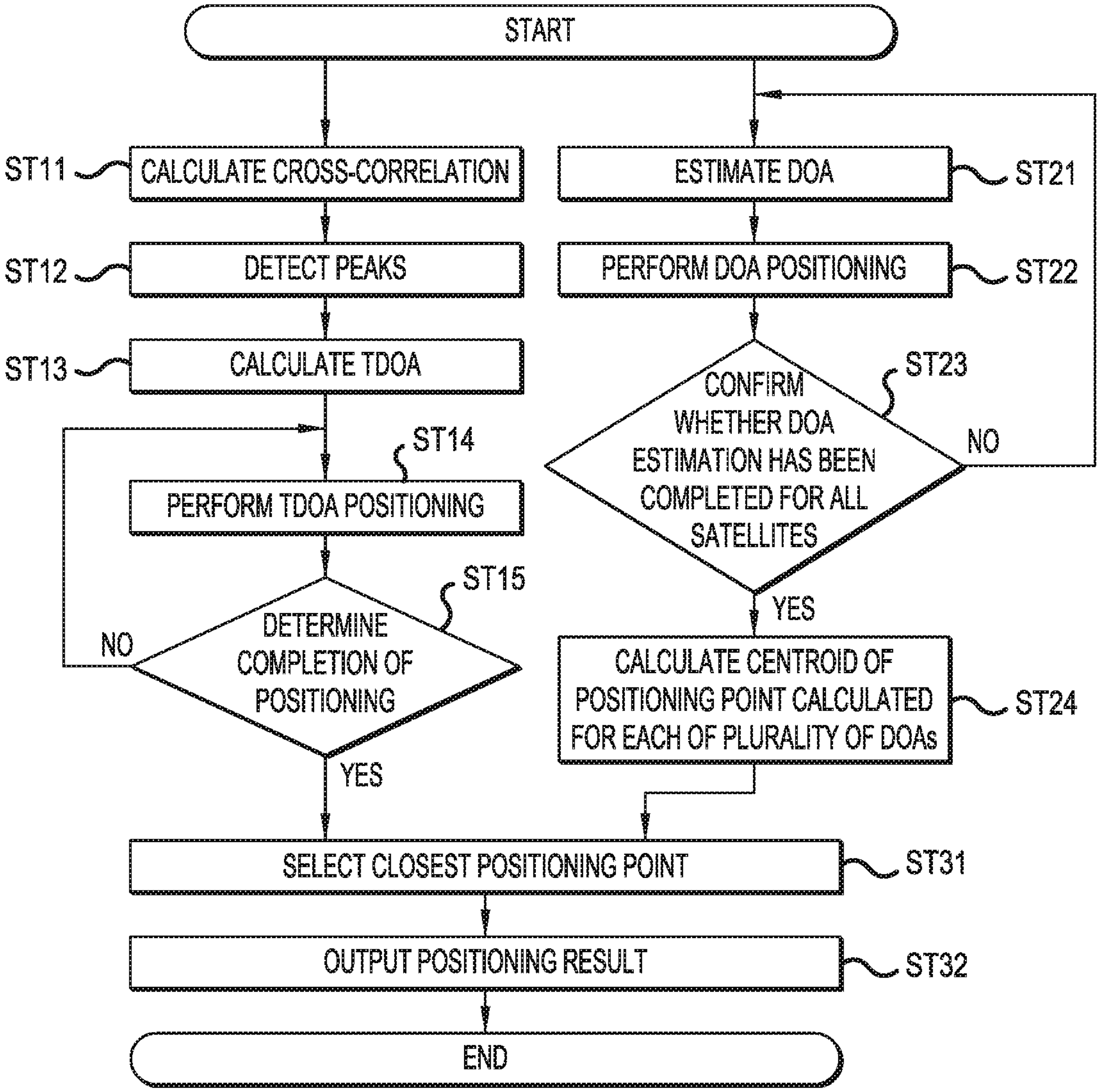
FIG. 6 is a flowchart illustrating a processing flow of the positioning device according to the second embodiment.

FIG. 6 is a flowchart illustrating a processing flow of the positioning device according to the second embodiment. As illustrated in FIG. 6, the positioning device according to the second embodiment includes, in addition to the processing steps described in the first embodiment, a step (ST23) of confirming whether DOA estimation has been completed for all the satellites in the processing step related to DOA, and a step (ST24) of calculating the centroid of the positioning point calculated for each of the plurality of DOAs.

The step (ST24) of calculating the centroid of the positioning point calculated for each of the plurality of DOAs is executed by the centroid value calculating unit 10, and specifically, the following calculation is performed.

$$C = \frac{1}{N}\sum_{n=1}^{N}\chi_n \tag{36}$$

Here, C is a centroid to be obtained, and N is the number of satellites as described above.

The ambiguity handling unit 8 according to the second embodiment selects, from among the plurality of positioning points calculated by the TDOA positioning processing unit 5, a positioning point closest to the centroid C of the positioning point calculated by the centroid value calculating unit 10, and outputs a positioning result with the selected value as the most likely positioning point p.

$$p = \underset{p_k}{\operatorname{argmin}} \| p_k - C \| \tag{37}$$

Here, the subscript k is used to distinguish the ambiguity of the TDOA. If the total number of ambiguities of the TDOA is K, k is used from 1 to K. In addition, the symbol //*// represents a norm here. The norm here has no problem as Euclidean norm.

Since the positioning device according to the second embodiment has the above configuration, the ambiguity handling unit 8 selects, from among the plurality of positioning points calculated by the TDOA positioning processing unit 5, a positioning point closest to the centroid C of the positioning point calculated by the centroid value calculating unit 10, and outputs a positioning result with the selected value as the most likely positioning point p. With this operation, the positioning device according to the present disclosure technology has an effect of positioning the positioning target with high accuracy even when a pulse radar wave is used as a transmission wave of the positioning target.

Third Embodiment

In the first embodiment and the second embodiment, positioning is performed on the basis of TDOA as an aspect of the present disclosure technology. The present disclosure technology is not limited thereto, and positioning may be performed on the basis of FDOA. A third embodiment illustrates an aspect of a positioning device that performs positioning on the basis of FDOA. In the third embodiment, the same reference numerals as those of the components used in the above-described embodiments are used unless otherwise specified. In the third embodiment, the description overlapping with the previously described embodiments is appropriately omitted.

A part of the positioning device according to the third embodiment can be implemented by a program executed on the processor 100. The hardware configuration in this case is as illustrated in FIG. 2. The positioning device according to the third embodiment performs a process for FDOA instead of the process for TDOA performed in the first embodiment.

Figure 7:
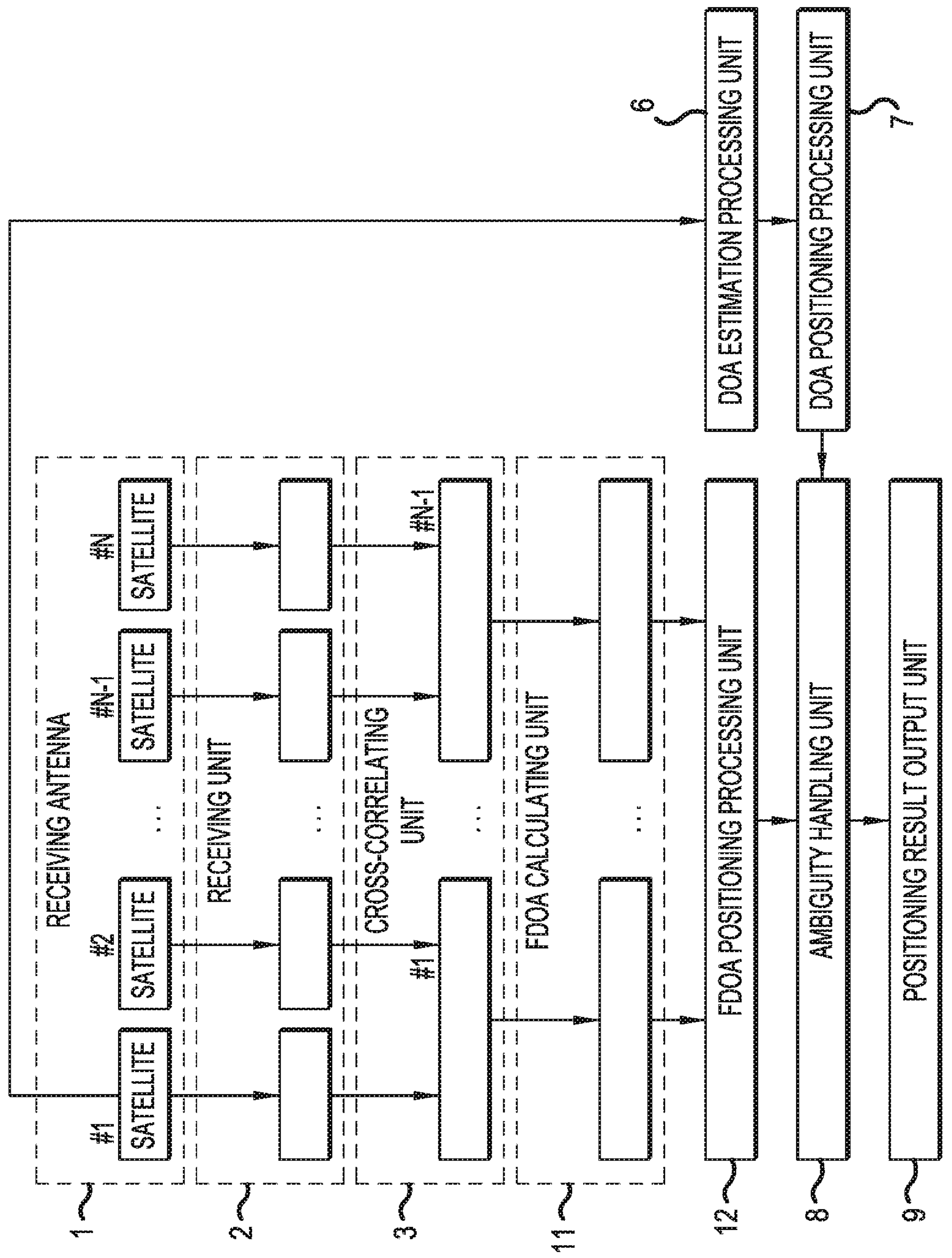
FIG. 7 is a functional block diagram illustrating a configuration of a positioning device according to a third embodiment.

FIG. 7 is a functional block diagram illustrating a configuration of the positioning device according to the third embodiment. As illustrated in FIG. 7, the positioning device according to the third embodiment includes an FDOA calculating unit 11 and an FDOA positioning processing unit 12 instead of the TDOA calculating unit 4 and the TDOA positioning processing unit 5 of the functional blocks of the first embodiment. Both TDOA and FDOA have a plurality of peaks at the output of cross-correlation, but the ambiguity of TDOA occurs for each PRI, whereas the ambiguity of FDOA occurs for each 1/PRI.

Figure 8:
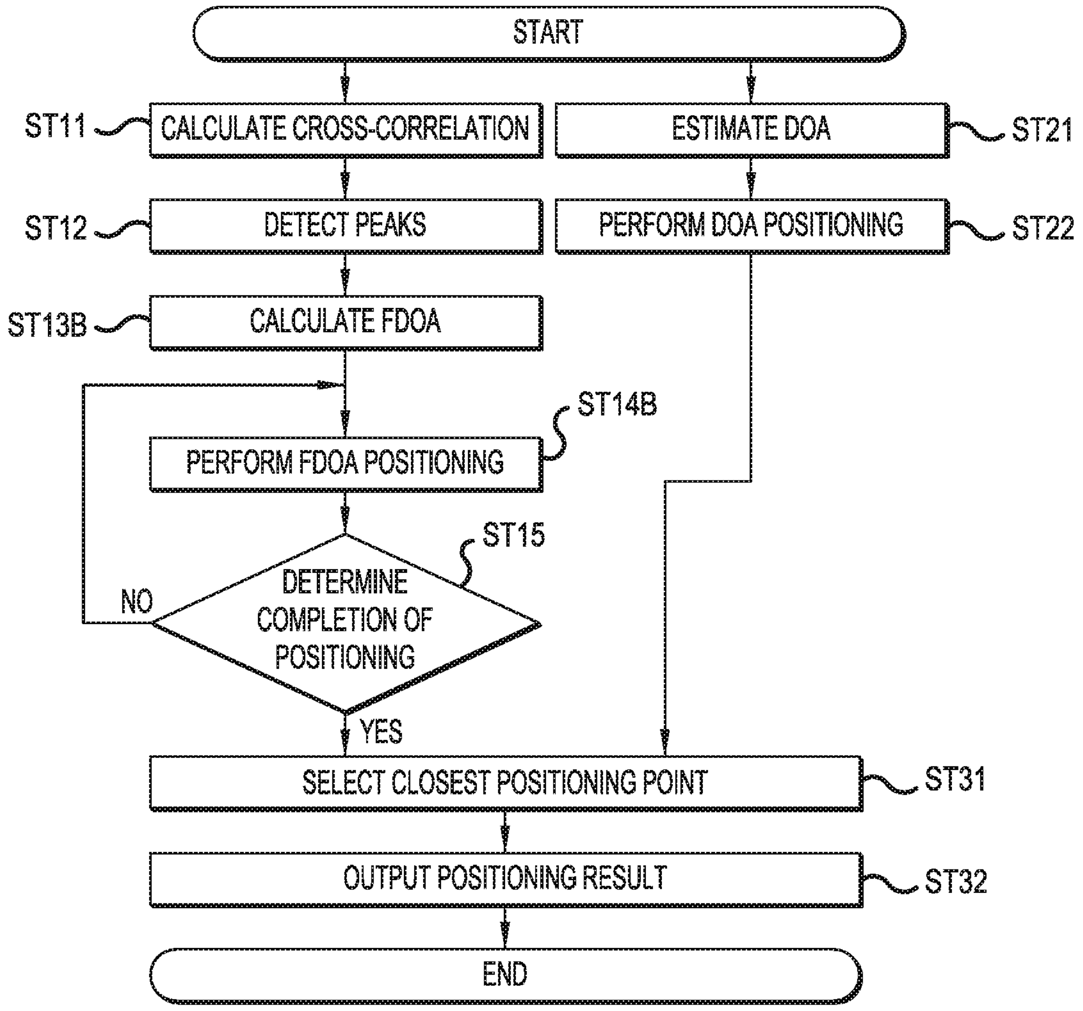
FIG. 8 is a flowchart illustrating a processing flow of the positioning device according to the third embodiment.

FIG. 8 is a flowchart illustrating a processing flow of the positioning device according to the third embodiment. As illustrated in FIG. 8, the positioning device according to the third embodiment executes a step (ST13B) of calculating FDOA and a step (ST14B) of performing FDOA positioning instead of the step (ST13) of calculating TDOA and the step (ST14) of performing TDOA positioning described in the first embodiment. The step (ST13B) of calculating FDOA is executed by the FDOA calculating unit 11, and the step (ST14B) of performing FDOA positioning is executed by the FDOA positioning processing unit 12.

The FDOA positioning processing unit 12 performs FDOA positioning on the basis of the calculated FDOA (step indicated by ST14B in FIG. 8). For example, in a case where the positions of the radio wave sources are measured by three satellites, the FDOA positioning processing unit 12 performs the iterative calculation expressed in the above Expression (20). However, in the case of FDOA positioning, $A_k$ and $u_k$ used for iterative calculation are as follows.

$$A_k = \begin{bmatrix} \nabla_p g_{12}^T \\ \nabla_p g_{12}^T \\ \nabla_p h^T \end{bmatrix} \tag{38}$$

$$\Delta u_k = \begin{bmatrix} \lambda FDOA_{12_k} - g_{12} \\ \lambda FDOA_{23_k} - g_{23} \\ R_E - h \end{bmatrix} \tag{39}$$

However, the subscript k (k=1, 2, . . . K) is for distinguishing the ambiguity of FDOA. K is the total number of ambiguities of the FDOA.

Processing after the step (ST14B) of performing FDOA positioning is the same as that described in the first embodiment.

Since the positioning device according to the third embodiment has the above configuration, the ambiguity handling unit 8 selects the positioning point closest to the positioning point X calculated by the DOA positioning processing unit 7 from among the plurality of positioning points calculated by the FDOA positioning processing unit 12, and outputs a positioning result with the selected value as the most likely positioning point p. With this operation, the positioning device according to the present disclosure technology has an effect of positioning the positioning target with high accuracy even when a pulse radar wave is used as a transmission wave of the positioning target.

Fourth Embodiment

In the third embodiment, positioning is performed on the basis of the FDOA, and a DOA is estimated by one satellite. In a fourth embodiment, positioning is performed on the basis of FDOA, and DOAs are estimated by a plurality of satellites. In the fourth embodiment, the same reference numerals as those of the components used in the above-described embodiments are used unless otherwise specified. In the fourth embodiment, the description overlapping with the previously described embodiment is appropriately omitted.

A part of a positioning device according to the fourth embodiment can be implemented by a program executed on the processor 100. The hardware configuration in this case is as illustrated in FIG. 2. The positioning device according to the fourth embodiment estimates the DOA, not just for information coming from one satellite as described in the third embodiment, but for each information coming from different satellites. The positioning device according to the fourth embodiment may calculate the centroid of the obtained plurality of positioning points, and use the calculated centroid value to replace the DOA estimation value by one satellite illustrated in the third embodiment.

Figure 9:
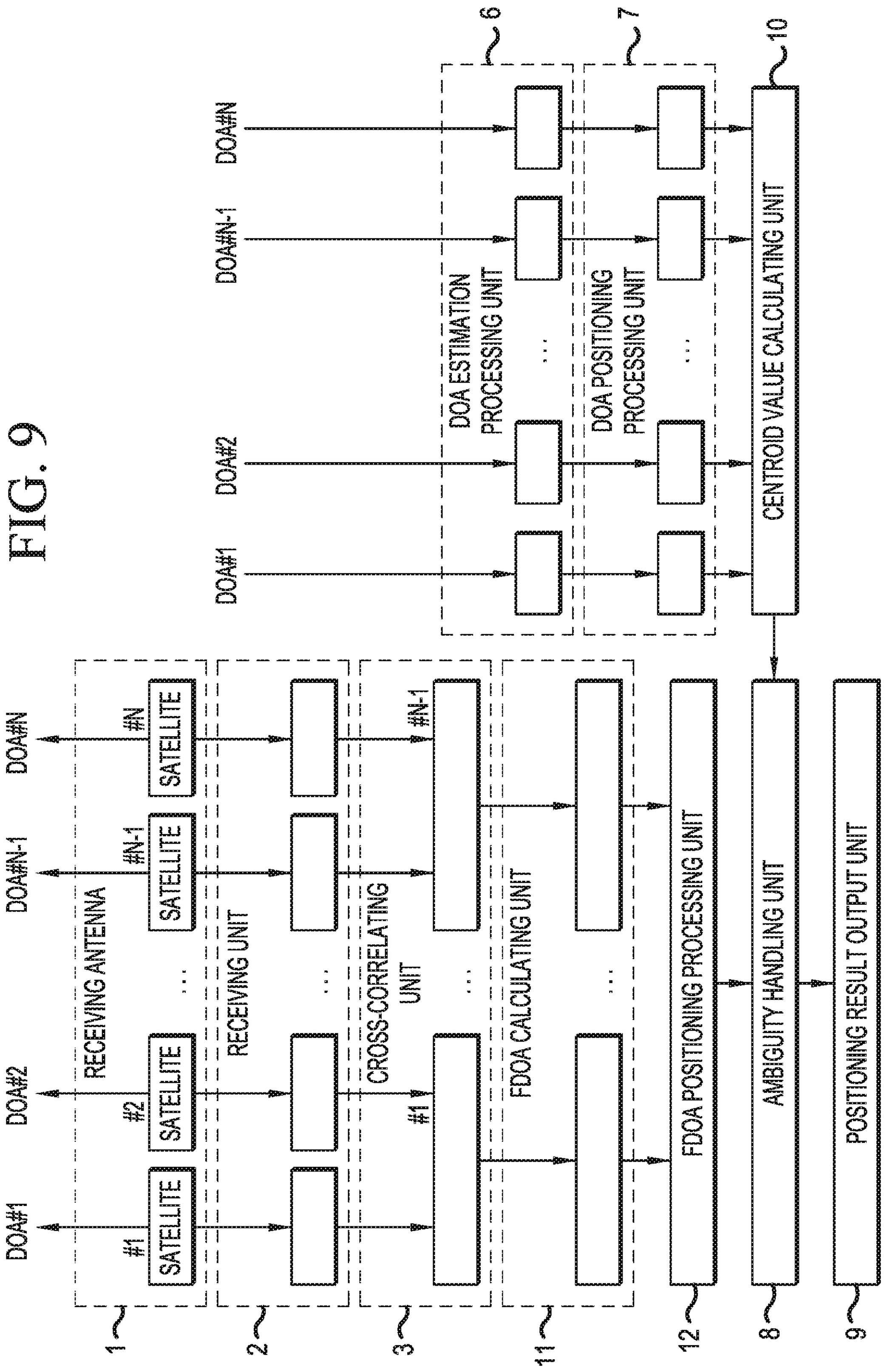
FIG. 9 is a functional block diagram illustrating a configuration of a positioning device according to a fourth embodiment.

FIG. 9 is a functional block diagram illustrating a configuration of a positioning device according to a fourth embodiment. As illustrated in FIG. 9, the positioning device according to the fourth embodiment includes a functional block of a centroid value calculating unit 10 in addition to the functional blocks described in the third embodiment. Furthermore, as illustrated in FIG. 9, in the positioning device according to the fourth embodiment, assuming that the number of satellites, that is, the number of receiving antennas is N, the DOA estimation processing unit 6 performs N pieces of independent processing corresponding to the respective receiving antennas. As does the DOA estimation processing unit 6, the DOA positioning processing unit 7 also performs N pieces of independent processing corresponding to the respective receiving antennas. A configuration in which the DOA estimation processing unit 6 and the DOA positioning processing unit 7 perform N pieces of independent processing in the fourth embodiment is the same as the configuration according to the second embodiment illustrated in FIG. 5.

Figure 10:
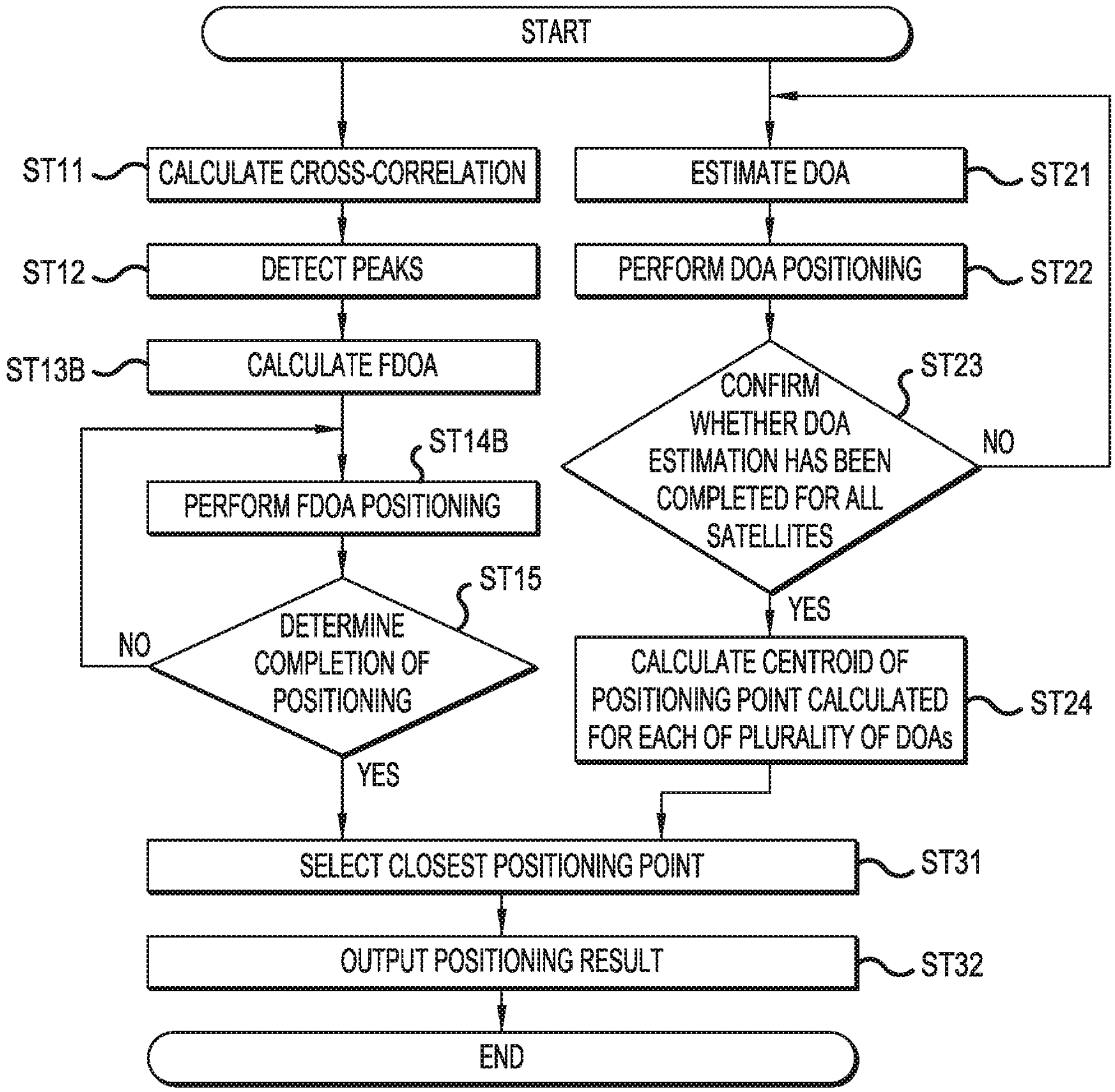
FIG. 10 is a flowchart illustrating a processing flow of the positioning device according to the fourth embodiment.

FIG. 10 is a flowchart illustrating a processing flow of the positioning device according to the fourth embodiment.

As illustrated in FIG. 10, the positioning device according to the fourth embodiment executes the step (ST13B) of calculating FDOA and the step (ST14B) of performing FDOA positioning instead of the step (ST13) of calculating TDOA and the step (ST14) of performing TDOA positioning described in the first embodiment. The step (ST13B) of calculating FDOA is executed by the FDOA calculating unit 11, and the step (ST14B) of performing FDOA positioning is executed by the FDOA positioning processing unit 12.

Furthermore, as illustrated in FIG. 10, the positioning device according to the fourth embodiment includes, in addition to the processing steps described in the third embodiment, the step (ST23) of confirming whether DOA estimation has been completed for all satellites in the processing step related to DOA, and the step (ST24) of calculating the centroid of the positioning point calculated for each of a plurality of DOAs.

The positioning device according to the fourth embodiment is a combination of the second embodiment and the third embodiment. As described above, the positioning device according to the present disclosure technology may be configured by freely combining the aspects described in each embodiment within the scope of creation of a technical idea.

As described above, the positioning device according to the fourth embodiment has the operations described in the second embodiment and the fourth embodiment, and has the effects described in the second embodiment and the third embodiment.

Fifth Embodiment

As described in the foregoing embodiments, the positioning method of the positioning device according to the present disclosure technology is not limited, and may be TDOA positioning or FDOA positioning. In a fifth embodiment, positioning of both TDOA and FDOA is performed.

Figure 11:
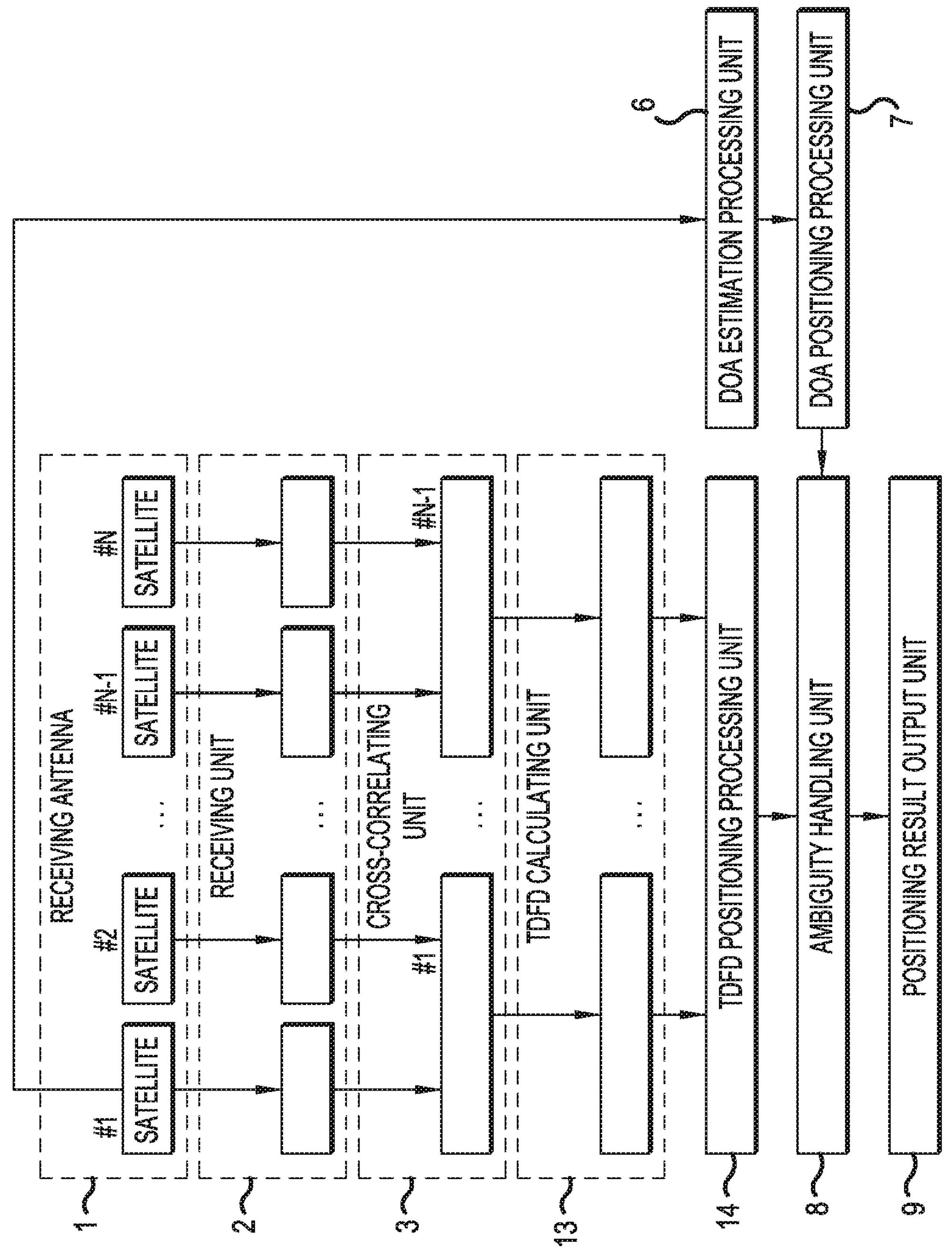
FIG. 11 is a functional block diagram illustrating a configuration of a positioning device according to a fifth embodiment.

FIG. 11 is a functional block diagram illustrating a configuration of a positioning device according to the fifth embodiment. As illustrated in FIG. 11, the positioning device according to the fifth embodiment includes a TDFD calculating unit 13 and a TDFD positioning processing unit 14 instead of the TDOA calculating unit 4 and the TDOA positioning processing unit 5 of the functional blocks of the first embodiment.

Figure 12:
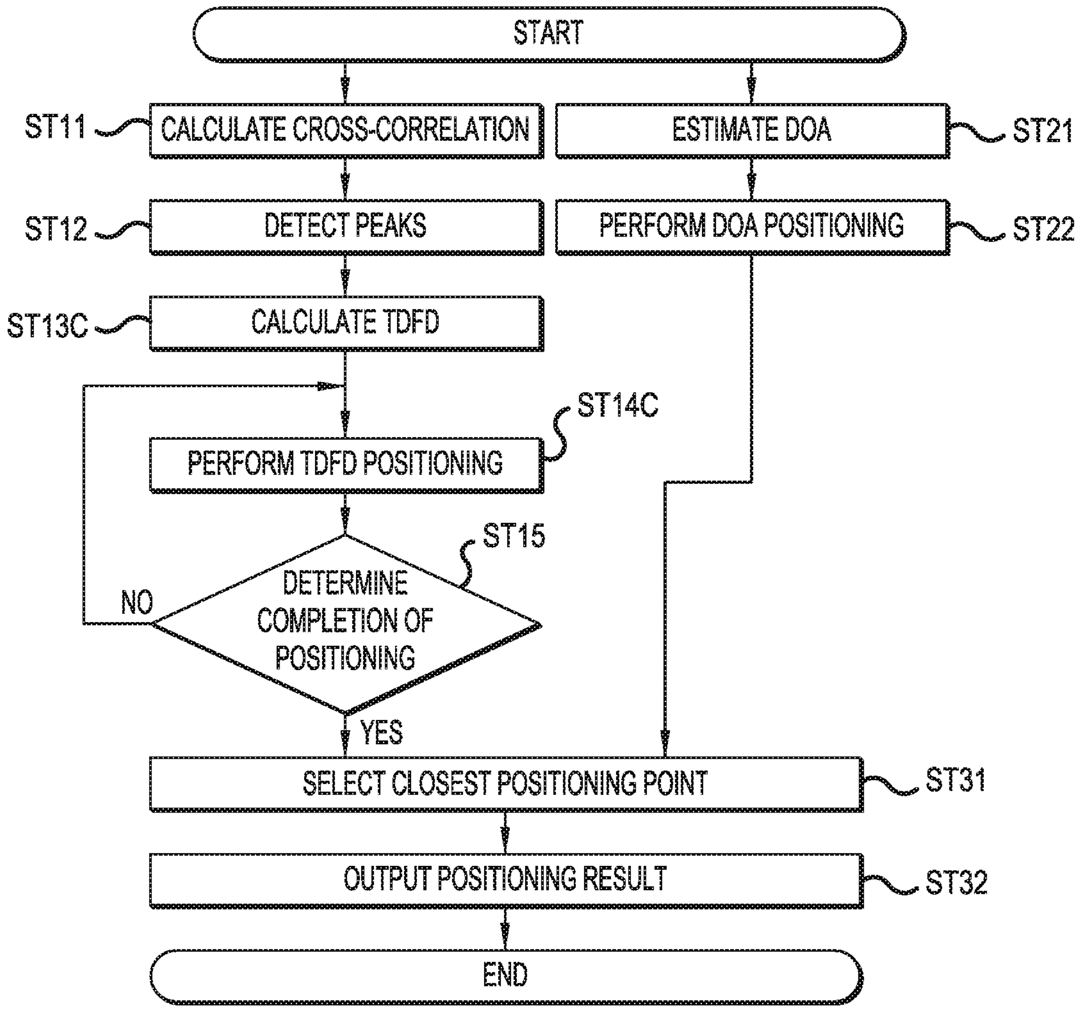
FIG. 12 is a flowchart illustrating a processing flow of the positioning device according to the fifth embodiment.

FIG. 12 is a flowchart illustrating a processing flow of the positioning device according to the fifth embodiment. As illustrated in FIG. 12, the positioning device according to the fifth embodiment executes a step (ST13C) of calculating a TDFD and a step (ST14C) of performing TDFD positioning instead of the step (ST13) of calculating TDOA and the step (ST14) of performing TDOA positioning described in the first embodiment. The step (ST13C) of calculating the TDFD is executed by the TDFD calculating unit 13, and the step (ST14C) of performing TDFD positioning is executed by the TDFD positioning processing unit 14.

The TDFD positioning processing unit 14 performs TDFD positioning on the basis of the calculated TDFD (step indicated by ST14C in FIG. 10). For example, in a case where the positions of the radio wave sources are measured by three satellites, the TDFD positioning processing unit 14 performs the iterative calculation expressed in the above Expression (20). However, in a case of the TDFD positioning, $A_k$ and $u_k$ used in the iterative calculation are vectors of an enlarged system in which dimensions are enlarged as follows.

$$A_k = \begin{bmatrix} \nabla_p f_{12}^T \\ \nabla_p f_{23}^T \\ \nabla_p g_{12}^T \\ \nabla_p g_{23}^T \\ \nabla_p h^T \end{bmatrix} \tag{40}$$

$$\Delta u_k = \begin{bmatrix} c\,TDOA_{12_k} - f_{12} \\ c\,TDOA_{23_k} - f_{23} \\ \lambda\,FDOA_{12_k} - g_{12} \\ \lambda\,FDOA_{23_k} - g_{23} \\ R_E - h \end{bmatrix} \tag{41}$$

Here, the subscript k (k=1, 2, . . . K) is used to distinguish the ambiguity. K is the total number of ambiguities.

Figure 13:
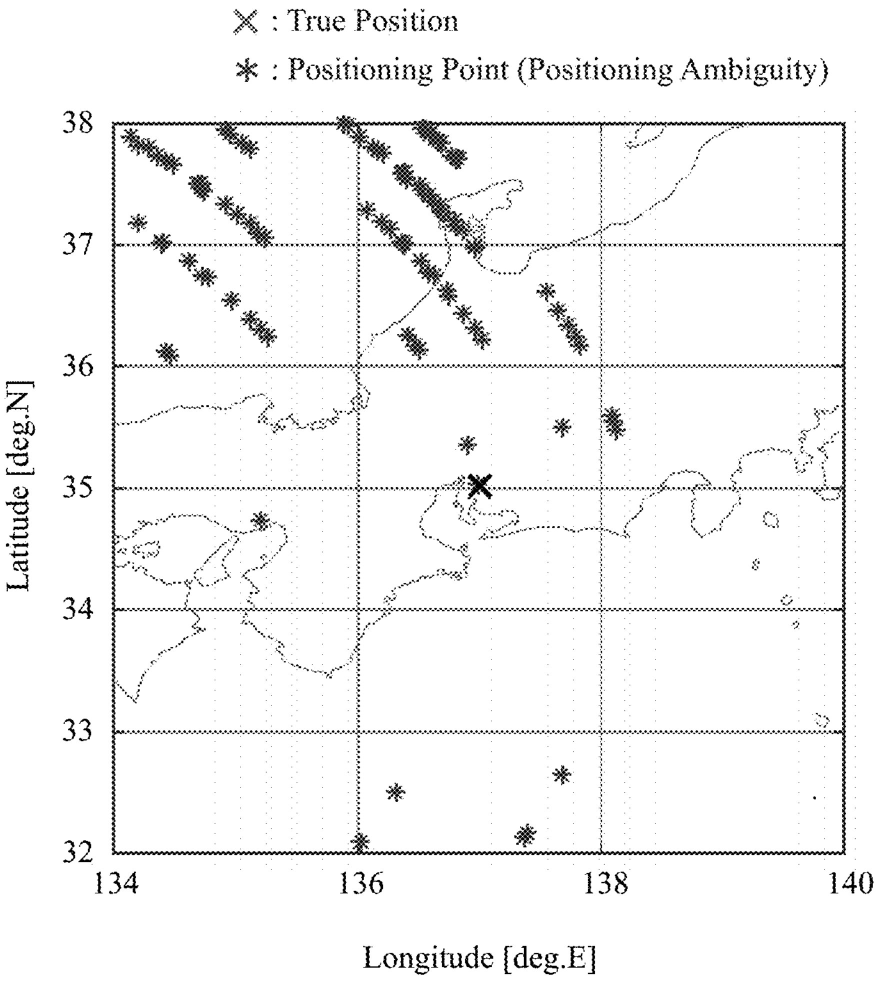
FIG. 13 is a schematic diagram Part 1 illustrating an effect of the positioning device according to the fifth embodiment.
Figure 14:
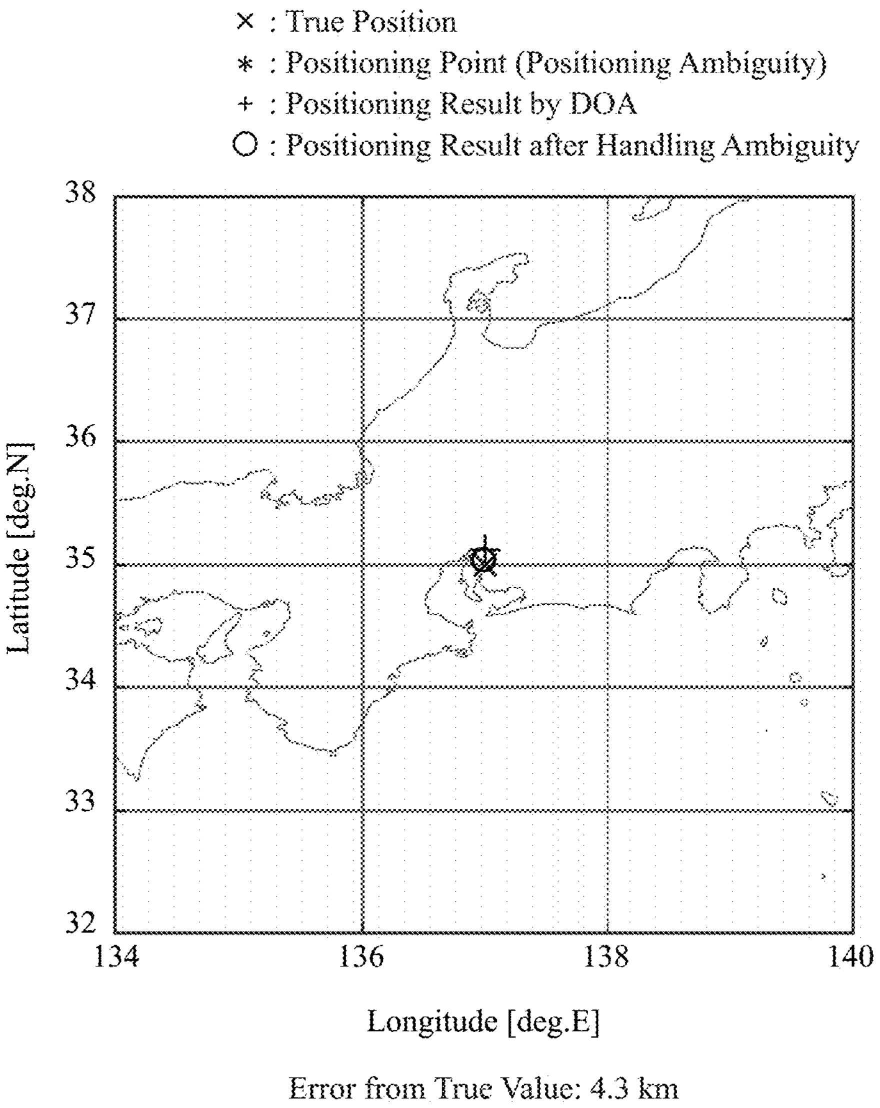
FIG. 14 is a schematic diagram Part 2 illustrating an effect of the positioning device according to the fifth embodiment.

The effect of the positioning device according to the fifth embodiment becomes clear from FIGS. 13 and 14. FIG. 13 is a schematic diagram Part 1 illustrating an effect of the positioning device according to the fifth embodiment. Further, FIG. 14 is a schematic diagram Part 2 illustrating an effect of the positioning device according to the fifth embodiment. More specifically, FIG. 13 illustrates data handled by the positioning device according to the fifth embodiment on a map, and indicates that the positioning result has ambiguity. More specifically, FIG. 14 illustrates positioning points estimated by the positioning device according to the fifth embodiment on a map. In the estimation result illustrated in FIG. 14, the positioning error is equal to or less than 4.3 [km].

Since the positioning device according to the fifth embodiment has the above configuration, the ambiguity handling unit 8 selects the positioning point closest to the positioning point X calculated by the DOA positioning processing unit 7 among the plurality of positioning points calculated by the TDFD positioning processing unit 14, and outputs a positioning result with the selected value as the most likely positioning point p. With this operation, the positioning device according to the present disclosure technology has an effect of positioning the positioning target with high accuracy even when a pulse radar wave is used as a transmission wave of the positioning target.

The aspect of the fifth embodiment described above has been described as one aspect of the present disclosure technology in which a DOA is estimated by one satellite. However, the present disclosure technology is not limited thereto. The positioning device according to the present disclosure technology may be a positioning device in which a plurality of satellites estimate a DOA by combining the above aspects with the second embodiment.

Sixth Embodiment

The positioning device according to the present disclosure technology may be devised to obtain the range of TDFD in advance when calculating the TDFD from the peak of the two-dimensional correlation calculation. A sixth embodiment illustrates a mode in which a functional block of a TDOA range calculating unit 15 is further included in addition to the functional blocks of the positioning device according to the first embodiment.

Figure 15:
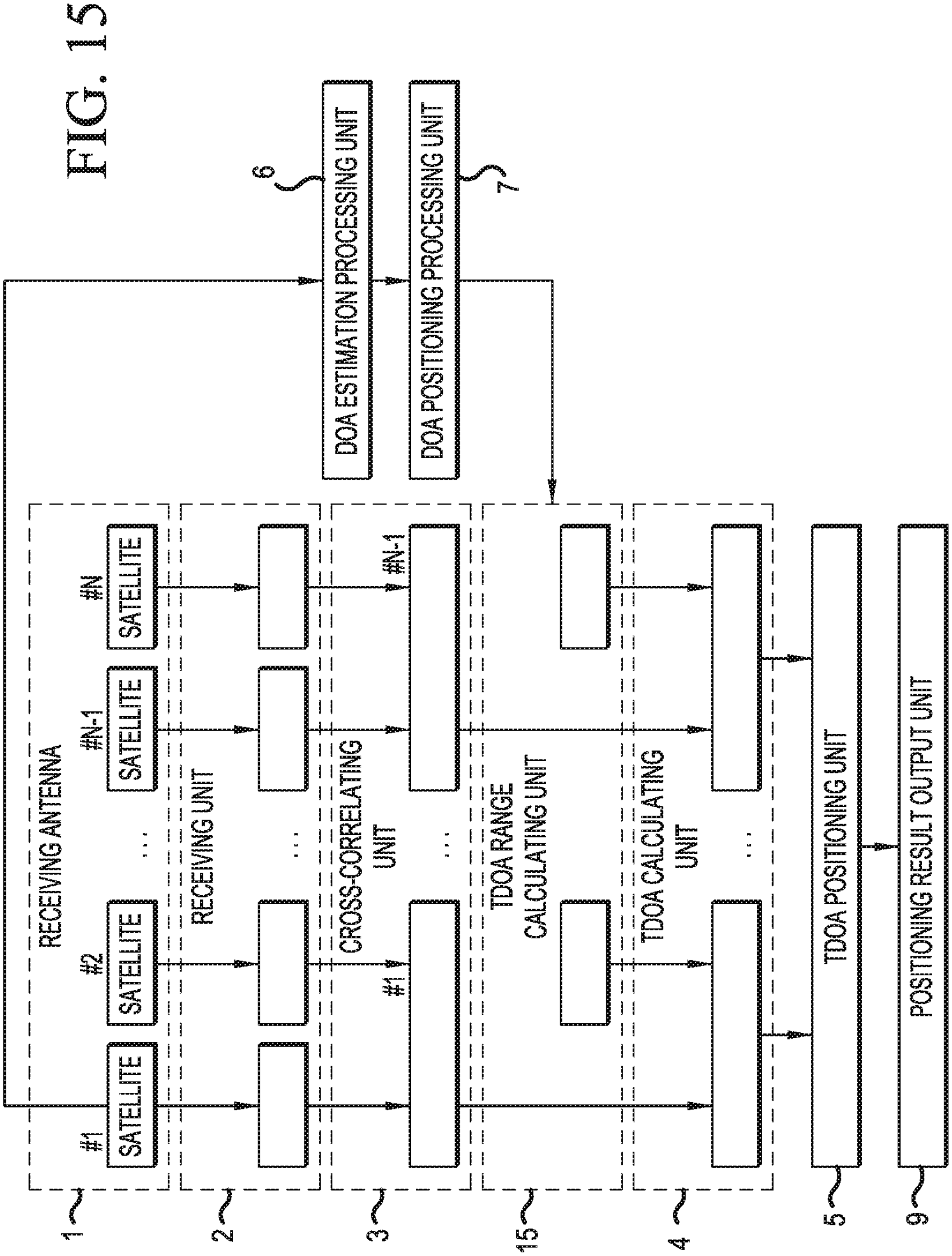
FIG. 15 is a functional block diagram illustrating a configuration of a positioning device according to a sixth embodiment.

FIG. 15 is a functional block diagram illustrating a configuration of a positioning device according to the sixth embodiment. As illustrated in FIG. 15, the positioning device according to the sixth embodiment includes a functional block of the TDOA range calculating unit 15 in addition to the functional blocks described in the first embodiment. As illustrated in FIG. 15, the number of TDOA range calculating units 15 may be equal to the number of TDOA calculating units 4. The TDOA range calculating unit 15 may be implemented as a program executed on the processor 100 illustrated in FIG. 2, or may be implemented by dedicated hardware.

Figure 16:
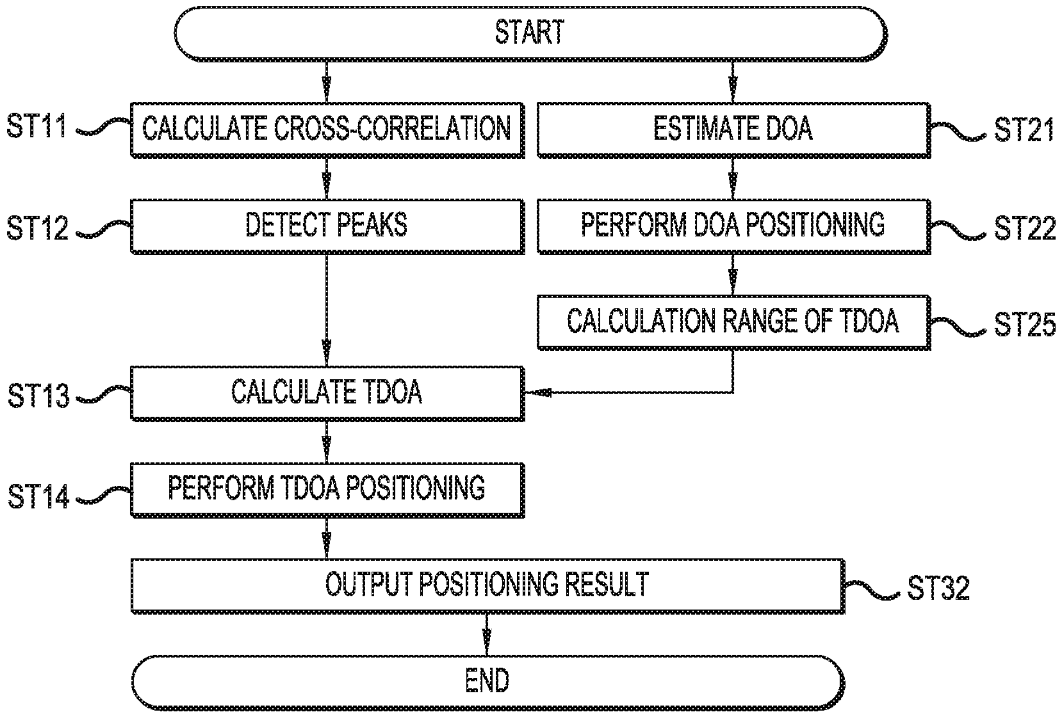
FIG. 16 is a flowchart illustrating a processing flow of the positioning device according to the sixth embodiment.

FIG. 16 is a flowchart illustrating a processing flow of the positioning device according to the sixth embodiment. As illustrated in FIG. 16, the positioning device according to the sixth embodiment further includes a step (ST25) of calculating a range of TDOA in the processing step related to DOA, in addition to the processing steps described in the first embodiment. The step (ST25) of calculating the range of TDOA is performed by the TDOA range calculating unit 15.

ST25 performed by the TDOA range calculating unit 15 becomes apparent from the following description on the basis of mathematical expressions. First, it is a well-known fact that a coordinate system represented by LON and LAT can be converted into an XYZ coordinate system at any time. Thus, the TDOA range calculating unit 15 converts the measured position value in the latitude-longitude display calculated from the DOA into a three-dimensional position vector that is an XYZ coordinate system. The converted three-dimensional position vector is $P_x$.

In an example in which the position of the radio wave source is measured using three satellites, the TDOA difference between satellite #1 and satellite #2 is obtained from Expression (1), and the TDOA difference between satellite #2 and satellite #3 is obtained from Expression (3) as follows.

$$TDOA_{12_X} = \frac{1}{c}\|p_X - p_{s1}\| - \frac{1}{c}\|p_X - p_{s2}\| \tag{42}$$

$$TDOA_{23_X} = \frac{1}{c}\|p_X - p_{s2}\| - \frac{1}{c}\|p_X - p_{s3}\| \tag{43}$$

Here, Expression (42) and Expression (43) use the fact that three-dimensional position vectors for three satellites, that is, $P_{s1}$, $P_{s2}$, and $P_{s3}$ are known.

The TDOA range calculating unit 15 may set the range of TDOA, that is, the upper limit and the lower limit of TDOA as follows, using the values obtained by Expression (42) and Expression (43) as reference values.

$$TDOA_{12_X} - \delta_{TDOA} \le TDOA_{12} \le TDOA_{12_X} + \delta_{TDOA} \tag{44}$$

$$TDOA_{23_X} - \delta_{TDOA} \le TDOA_{23} \le TDOA_{23_X} + \delta_{TDOA} \tag{45}$$

Here, $2\delta_{TDOA}$ is the width of the TDOA (hereinafter, referred to as a "TDOA-width"). The TDOA-width may be set to be equal to or less than the PRI of the pulse radar wave of the transmission source as the positioning target.

Setting the TDOA-width to be equal to or less than the PRI of the pulse radar wave of the transmission source has an effect of narrowing the set of the expression (20), the expression (21), and the expression (22) of the iterative calculation necessary for the number of ambiguities into one set. Specifically, a set of expressions of the iterative calculation performed by the TDOA calculating unit 4 according to the sixth embodiment is as follows.

$$p = p + A^{-1}\Delta u \tag{46}$$

Here, A and Δu are given by the following mathematical expressions.

$$A = \begin{bmatrix} \nabla_p f_{12}^T \\ \nabla_p f_{23}^T \\ \nabla_p h^T \end{bmatrix} \tag{47}$$

$$\Delta u = \begin{bmatrix} c\,TDOA_{12} - f_{12} \\ c\,TDOA_{23} - f_{23} \\ R_E - h \end{bmatrix} \tag{48}$$

As described above, since the positioning device according to the sixth embodiment has the above configuration, in addition to the effect described in the first embodiment, there is an effect that the number of sets of iterative calculations required as many as the number of ambiguities can be narrowed down to one set.

The aspect of the sixth embodiment described above has been described as one aspect of the present disclosure technology in which a DOA is estimated by one satellite. However, the present disclosure technology is not limited thereto. The positioning device according to the present disclosure technology may be a positioning device in which a plurality of satellites estimate a DOA by combining the above aspects with the second embodiment. That is, the range of TDOA calculated by the TDOA range calculating unit 15 may be determined with the centroid of DOA estimated by a plurality of satellites, and a reference value of the range may be determined.

Seventh Embodiment

The positioning device according to the present disclosure technology may be devised to obtain the range of TDFD in advance when calculating the TDFD from the peak of the two-dimensional. correlation calculation. A seventh embodiment illustrates a mode in which a functional block of the FDOA range calculating unit 16 is further included in addition to the functional blocks of the positioning device according to the third embodiment.

Figure 17:
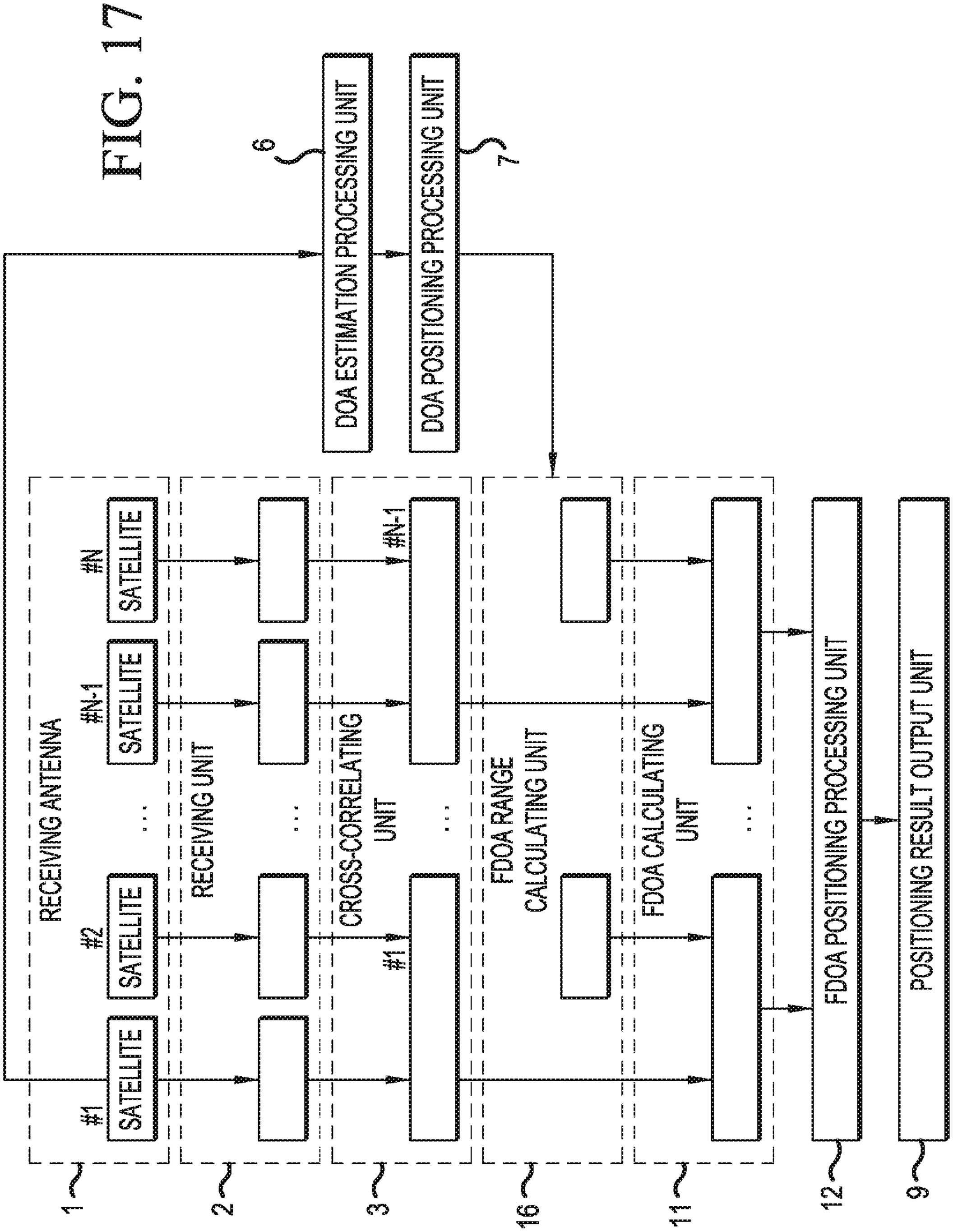
FIG. 17 is a functional block diagram illustrating a configuration of a positioning device according to a seventh embodiment.

FIG. 17 is a functional block diagram illustrating a configuration of a positioning device according to the seventh embodiment. As illustrated in FIG. 17, the positioning device according to the seventh embodiment includes functional blocks of the FDOA range calculating unit 16 in addition to the functional blocks illustrated in the third embodiment.

Figure 18:
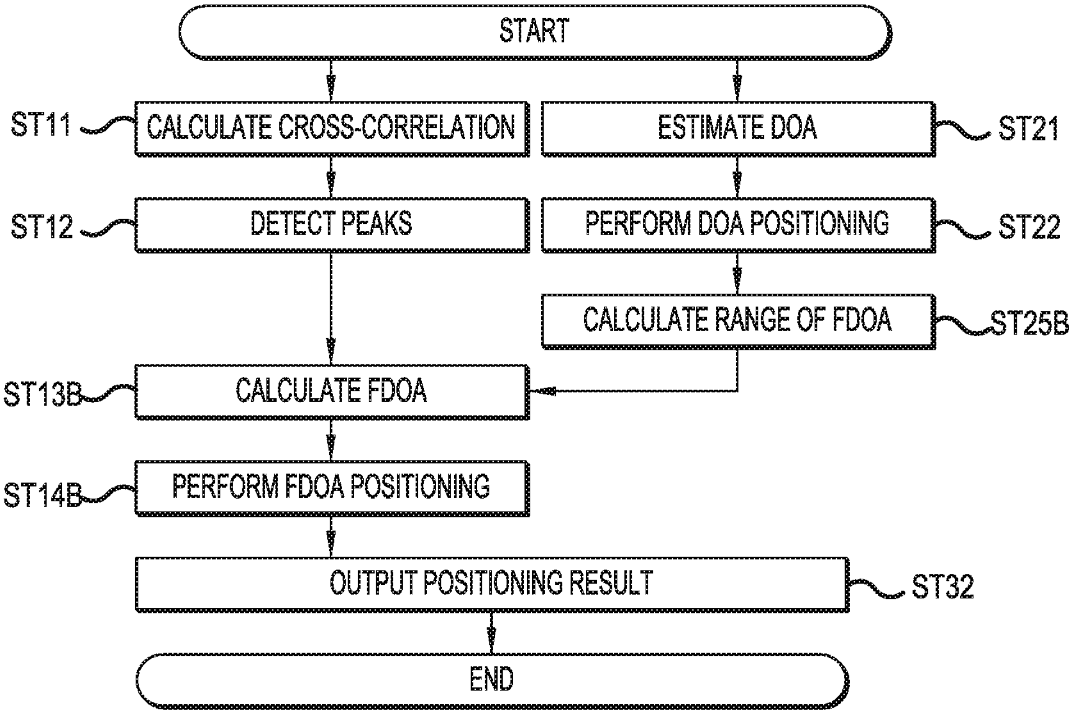
FIG. 18 is a flowchart illustrating a processing flow of the positioning device according to the seventh embodiment.

FIG. 18 is a flowchart illustrating a processing flow of the positioning device according to the seventh embodiment. As illustrated in FIG. 18, the positioning device according to the seventh embodiment further includes a step (ST25B) of calculating a range of FDOA in the processing step related to DOA, in addition to the processing steps described in the third embodiment. The step (ST25B) of calculating the FDOA range is performed by the FDOA range calculating unit 16.

In an example in which the position of the radio wave source is measured using three satellites, the FDOA difference between satellite #1 and satellite #2 is obtained from Expression (2), and the FDOA difference between satellite #2 and satellite #3 is obtained from Expression (4) as follows.

$$FDOA_{12_X} = \frac{1}{\lambda}\frac{v_{s1}^T(p_X - p_{s1})}{\|p_X - p_{s1}\|} - \frac{1}{\lambda}\frac{v_{s2}^T(p_X - p_{s2})}{\|p_X - p_{s2}\|} \quad (49)$$

$$FDOA_{23_X} = \frac{1}{\lambda}\frac{v_{s2}^T(p_X - p_{s2})}{\|p_X - p_{s2}\|} - \frac{1}{\lambda}\frac{v_{s3}^T(p_X - p_{s3})}{\|p_X - p_{s3}\|} \quad (50)$$

The FDOA range calculating unit 16 may set the range of FDOA, that is, the upper limit and the lower limit of FDOA as follows, using the values obtained by the Expressions (49) and (50) as reference values.

$$FDOA_{12_X} - \delta_{FDOA} \le FDOA_{12} \le FDOA_{12_X} + \delta_{FDOA} \quad (51)$$

$$FDOA_{23_X} - \delta_{FDOA} \le FDOA_{23} \le FDOA_{23_X} + \delta_{FDOA} \quad (52)$$

Here, $2\delta_{FDOA}$ is the width of FDOA (hereinafter referred to as "FDOA-width"). The FDOA-width may be set to be equal to or less than a reciprocal of the PRI of the pulse radar wave of the transmission source as the positioning target, that is, 1/PRI.

Setting the FDOA-width to be equal to or less than 1/PRI of the transmission source has an effect of narrowing the set of the expression (20), the expression (38), and the expression (39) of the iterative calculation required for the number of ambiguities to one set. Specifically, the expression of the iterative calculation performed by the FDOA calculating unit 11 according to the seventh embodiment is the same as the expression (46). However, A and Δu are given by the following mathematical expressions.

$$A = \begin{bmatrix} \nabla_p g_{12}^T \\ \nabla_p g_{12}^T \\ \nabla_p h^T \end{bmatrix} \quad (53)$$

$$\Delta u = \begin{bmatrix} \lambda\, FDOA_{12} - g_{12} \\ \lambda\, FDOA_{23} - g_{23} \\ R_E - h \end{bmatrix} \quad (54)$$

As described above, since the positioning device according to the seventh embodiment has the above configuration, in addition to the effects described in the third embodiment, there is an effect that the number of sets of iterative calculations required as many as the number of ambiguities can be narrowed down to one set.

The aspect of the seventh embodiment described above has been described as one aspect of the present disclosure technology in which a DOA is estimated by one satellite. However, the present disclosure technology is not limited thereto. The positioning device according to the present disclosure technology may be a positioning device in which a plurality of satellites estimate a DOA by combining the above aspects with the fourth embodiment. That is, the range of FDOA calculated by the FDOA range calculating unit 16 may be determined on the basis of the centroid of DOA estimated by a plurality of satellites, and a reference value of the range may be determined.

Another embodiment of the positioning device according to the present disclosure technology may be implemented by combining the sixth embodiment and the seventh embodiment. That is, the TDFD range calculating unit 17 may calculate the range of TDFD with respect to the mode described in the fifth embodiment in which both the TDOA and the FDOA are positioned. Also in this case, the DOA may be estimated by one satellite or by a plurality of satellites.

Eighth Embodiment

In obtaining TDOA and FDOA, the positioning device according to the present disclosure technology may be devised to select a most likely TDOA measurement value and FDOA measurement value by obtaining an "presence expected area" in which a true value is expected to be present in a space including a dimension of TDOA and a dimension of FDOA (hereinafter referred to as "TDOA-FDOA space"). A positioning device according to an eighth embodiment calculates a "presence expected area" and obtains the most likely TDOA measurement value and FDOA measurement value.

Figure 19:
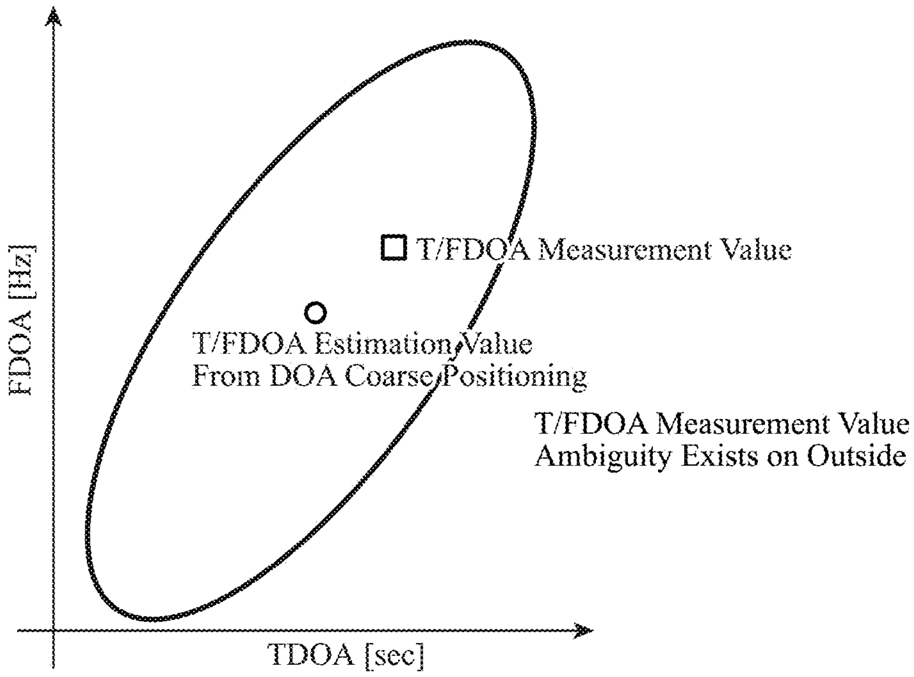
FIG. 19 is a conceptual diagram illustrating a presence expected area in a TDOA-FDOA space.

FIG. 19 is a conceptual diagram illustrating a "presence expected area" in the TDOA-FDOA space. In the TDOA-FDOA space illustrated in FIG. 19, the "presence expected area" is indicated by an ellipse.

Figure 20:
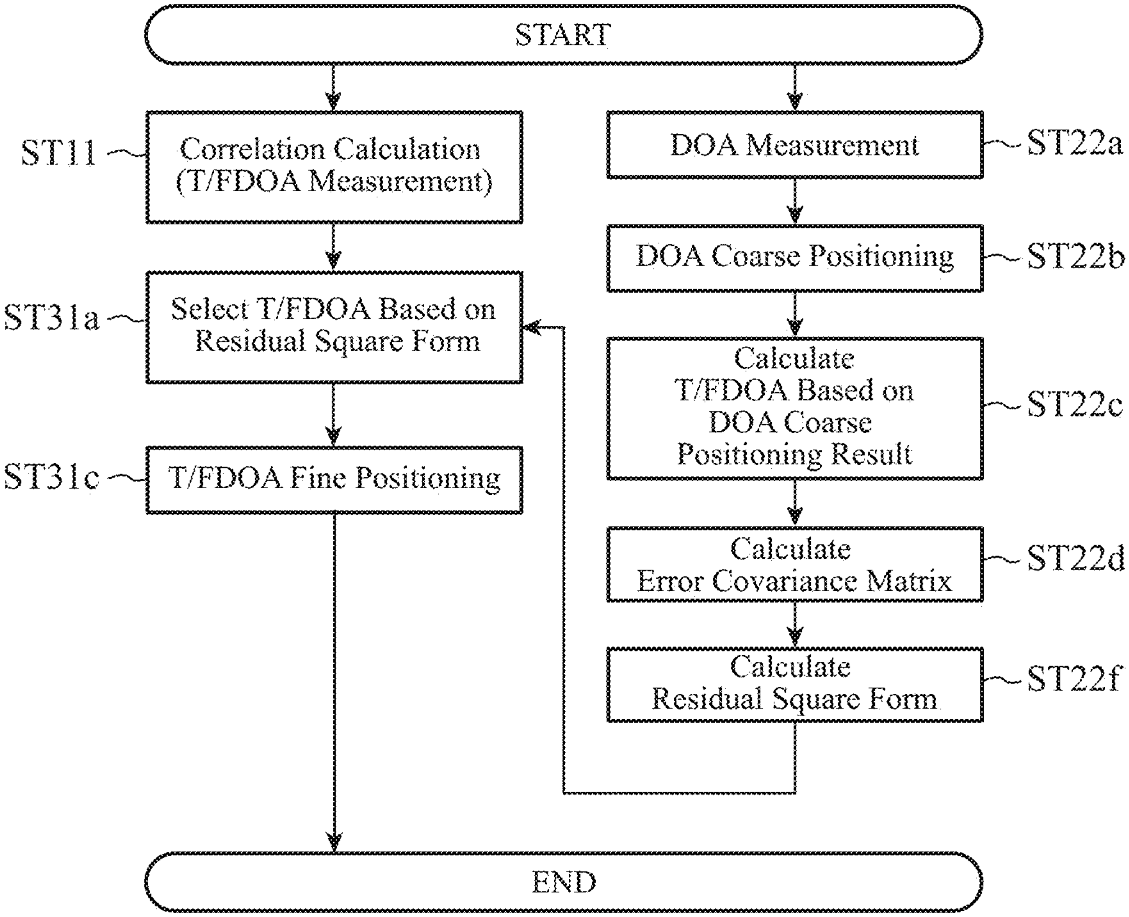
FIG. 20 is a flowchart illustrating a processing flow of a positioning device according to an eighth embodiment.

FIG. 20 is a flowchart illustrating a processing flow of the positioning device according to the eighth embodiment. As illustrated in FIG. 20, the processing of the positioning device according to the eighth embodiment is also roughly divided into three parts. A first part is a processing step related to TDFD (In FIG. 20 and the like, TDFD is displayed as "T/FDOA"). The processing steps related to TDFD include calculating cross-correlation (ST11). The second part is a processing step related to DOA. The processing steps related to DOA include a processing step (ST22*a*) of performing DOA measurement, a processing step (ST22*b*) of performing DOA coarse positioning, a processing step (ST22*c*) of calculating a TDFD based on a DOA coarse positioning result, a step (ST22*d*) of calculating an error covariance matrix, and a step (ST22*f*) of calculating a residual square form. The third part is a processing step utilizing the TDOA result and the DOA result. The processing steps here include a step (ST31*a*) of selecting a TDFD based on the residual square form and a step (ST31*c*) of performing TDFD fine positioning.

The positioning device according to the eighth embodiment performs processing on the basis of an idea that an observation value ($z_{TDFD}$) of the TDFD is represented by the following mathematical model (also referred to as a measurement model).

$$z_{TDFD} = h_{TDFD}(p_t, p_{sat2}, v_{sat2}) + n_{TDFD} \tag{55}$$

However, a true value ($h_{TDFD}$) of the desired TDFD is expressed by the following expression. Note that, hereinafter, for the sake of simplicity, the mathematical expressions are on the basis of satellite #1 and satellite #2, but the mathematical expressions can be generalized and applied even when the number of satellites increases.

$$h_{TDFD})(p_t, p_{sat2}, v_{sat2}) = \begin{bmatrix} TDOA_{12}(p_t, p_{sat2}) \\ FDOA_{12}(p_t, p_{sat2}, v_{sat2}) \end{bmatrix} \tag{56}$$

Here, $p_t$ is a three-dimensional position vector of an interference station. The interference station is a wireless station in which an ambiguity occurs in the position and the velocity due to radio interference. More specifically, the component of the vector $h_{TDFD}$ is derived as follows from Expressions (1) and (2).

$$TDOA_{12}(p_t, p_{sat2}) = \frac{1}{c}\|p_t - p_{s1}\| - \frac{1}{c}\|p_t - p_{sz}\| \tag{57}$$

$$FDOA_{12} = (p_t, p_{sat2}, v_{sat2}) = \frac{1}{\lambda}\frac{v_{s1}^T(p_t - p_{s1})}{\|p_t - p_{s1}\|} - \frac{1}{\lambda}\frac{v_{s2}^T(p_t - p_{s2})}{\|p_t - p_{s2}\|} \tag{58}$$

In addition, a vector $n_{TDFD}$ of Expression (55) is a measurement error vector representing observation noise or a measurement error. The measurement error vector ($n_{TDFD}$) can be assumed to have a property expressed by the following mathematical expression.

$$E\{n_{TDFD}n_{TDFD}^T\} = \text{diag}\{\sigma_{TDOA}^2, \sigma_{FDOA}^2\} \tag{59}$$

$$=: R_{TDFD}$$

$$E\{n_{TDFD}) = 0 \tag{60}$$

Here, E{ } is a function representing an expected value. In Expression (59), $$\sigma_{TDOA}^2$$

represents the variance of the measured TDOA, and $$\sigma_{FDOA}^2$$

represents the variance of the measured FDOA. R in bold font in Expression (59) is an error covariance matrix. In addition, 0 (zero) in bold font on the right side of Expression (60) is a zero vector in which all elements are 0 (zero). Expression (60) indicates that each element of the measurement error vector ($N_{TDFD}$) has a statistical average of 0 (zero).

In Expressions (55) to (58), $P_{sat2}$ used as an argument of a function collectively represents position vectors $p_{si}$ (i=1, 2, . . . ) of all satellites. Similarly, $v_{sat2}$ collectively represents the velocity vectors $v_{si}$ (i=1, 2, . . . ) of all the satellites. It is assumed that $P_{sat2}$ and $v_{sat2}$ are expressed by mathematical symbols representing the following set.

$$p_{sat2} = \{p_{s1}, p_{s2}, \ldots, p_{sn}\} \tag{61}$$

$$v_{sat2} = \{v_{s1}, v_{s2}, \ldots, v_{sn}\} \tag{62}$$

Note that sat in the subscript sat2 in Expressions (61) and (62) is the first three characters in an English word "satellite" meaning a satellite.

The interference station ($p_t$) is bound by the constraint condition that the interference station ($p_t$) is on the ground surface as are the radio wave sources that are other positioning targets.

$$\|p_t\| = R_E \tag{63}$$

Here, $R_E$ represents the radius of the earth as in Expression (5).

It can be said that the above expressions (55) to (63) represent the interference station ($p_t$) in an Earth Centered Earth Fixed coordinate system (ECEF coordinate system), that is, the coordinate system fixed to the earth with the center of the earth as the origin.

Figure 23:
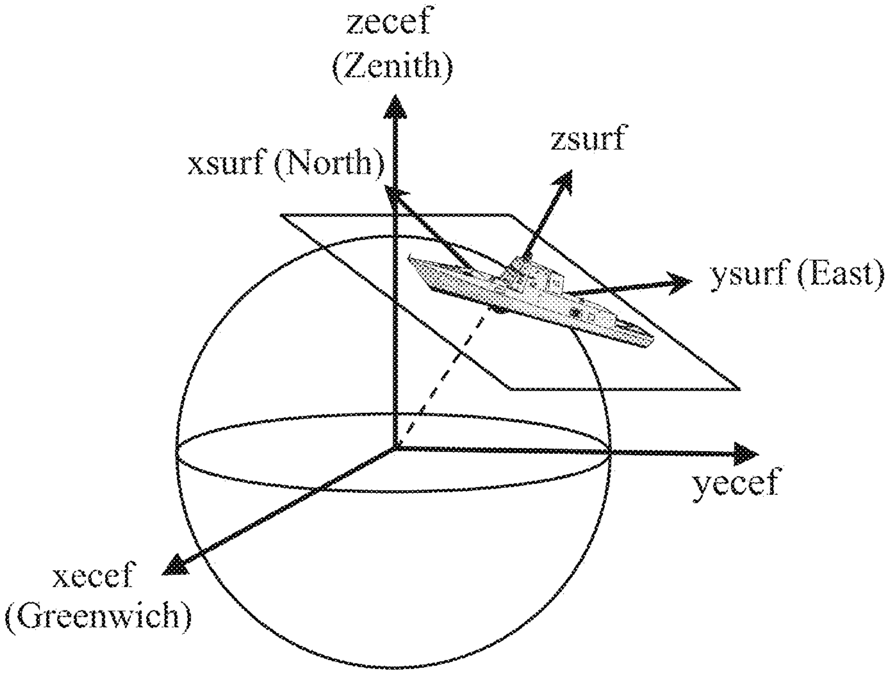
FIG. 23 is a schematic diagram illustrating an ECEF coordinate system and a ground surface coordinate system.

FIG. 23 is a schematic diagram illustrating the ECEF coordinate system.

Considering that a point represented in the ECEF coordinate system is a point on the surface of the Earth, it can also be represented in a polar coordinate system (also referred to as a POLAR coordinate system). That is, any point on the surface of the earth can be expressed by a polar coordinate system in which the radius ($R_E$) of the earth is known and the latitude and longitude are elements. The interference station ($p_t$) can also be expressed as in Expression (23).

$$\mathcal{X}_t = (Lon_t, Lat_t)^T \tag{64}$$

Here, $Lon_t$ represents the longitude of the interference station, and $Lat_t$ represents the latitude of the interference station.

The positioning device according to the eighth embodiment considers a minimization problem expressed by the following mathematical expression.

$$\text{find}_{\mathcal{X}_t}\text{ s.t. } \underset{\mathcal{X}_t}{\text{argmin}}\, J_{TDFD}(\mathcal{X}_t) \tag{65}$$

Here, the $J_{TDFD}$ of the evaluation function to be minimized is expressed by the following expression.

$$J_{TDFD}(\mathcal{X}_t) := (z_{TDFD} - h_{TDFD}(p_t))^T R_{TDFD}^{-1}(z_{TDFD} - h_{TDFD}(p_t)) \tag{66}$$

Expression (66) can be said to be a problem of the weighted least squares method. The inverse matrix of the error covariance matrix $R_{TDFD}$ on the right side of Expression (66) can be interpreted as a weight for equally handling TDOA and FDOA having different physical dimensions. A pseudo-inverse matrix method for solving a least squares problem can be applied to Expression (66).

The DOA positioning processing unit 7 of the positioning device according to the eighth embodiment performs processing on the basis of an idea that an observation value ($z_{DOA}$) of the DOA is represented by the following mathematical model (also referred to as a measurement model).

$$Z_{DOA} = h_{DOA}(p_t, p_{sat2}) + n_{DOA} \tag{67}$$

However, the true value ($h_{DOA}$) of the desired DOA is expressed by the following expression.

$$h_{DOA}(p_t, p_{sat2}) = \begin{bmatrix} Az(p_t, p_{sat2}) \\ El(p_t, p_{sat2}) \end{bmatrix} \tag{68}$$

Furthermore, each element on the right side of Expression (68) is expressed by the following expressions.

$$Az = \tan^{-1}\left(\frac{y_{doa}}{x_{doa}}\right) \tag{69}$$

$$El = \tan^{-1}\left(\frac{z_{doa}}{\sqrt{x_{doa}^2 + y_{doa}^2}}\right) \tag{70}$$

Note that $\tan^{-1}$ means arctangent.

A vector $n_{DOA}$ in Expression (67) is a measurement error vector representing observation noise or a measurement error with respect to the DOA. The measurement error vector ($n_{DOA}$) can be assumed to have a property expressed by the following mathematical expression.

$$\begin{aligned} E\{n_{DOA} n_{DOA}^T\} &= \mathrm{diag}\{\sigma_{AZ}^2, \sigma_{EL}^2\} \\ &=: R_{DOA} \end{aligned} \tag{71}$$

A coordinate system including ($x_{doa}$, $y_{doa}$, $z_{doa}$) when calculating Azimuth (azimuth angle) and Elevation (elevation angle) by Expressions (69) and (70) is referred to as a "DOA coordinate system". The relative position vector of the radio wave source viewed from the satellites in the ECEF coordinate system can be expressed in the DOA coordinate system by the following primary conversion.

$$\begin{aligned} \begin{bmatrix} x_{doa} \\ y_{doa} \\ z_{doa} \end{bmatrix} &=: p_{doa} \\ &= DC\{p_{ecef\_tgt} - p_{ecef\_sat}\} \\ &= \begin{bmatrix} -\cos(Lon)\cos(Lat) & -\sin(Lon)\cos(Lat) & -\sin(Lat) \\ -\sin(Lon) & \cos(Lon) & 0 \\ -\cos(Lon)\sin(Lat) & -\sin(Lon)\sin(Lat) & \cos(Lat) \end{bmatrix} \{p_{ecef\_tgt} - p_{ecef\_sat}\} \end{aligned}$$

wherein $$D = \begin{bmatrix} 0 & 0 & -1 \\ 0 & 1 & 0 \\ 1 & 0 & 0 \end{bmatrix} \tag{72}$$

$$\begin{aligned} C &= \overbrace{\begin{bmatrix} 0 & 0 & 1 \\ 0 & 1 & 0 \\ 1 & 0 & 0 \end{bmatrix}}^{\text{change axis}} \overbrace{\begin{bmatrix} \cos(Lat) & 0 & \sin(Lat) \\ 0 & 1 & 0 \\ -\sin(Lat) & 0 & \cos(Lat) \end{bmatrix}}^{y\text{ axis }(-)\text{Rotation}} \overbrace{\begin{bmatrix} \cos(Lon) & \sin(Lon) & 0 \\ -\sin(Lon) & \cos(Lon) & 0 \\ 0 & 0 & 1 \end{bmatrix}}^{z\text{ axis }(+)\text{Rotation}} \\ &= \begin{bmatrix} -\cos(Lon)\sin(Lat) & -\sin(Lon)\sin(Lat) & \cos(Lat) \\ -\sin(Lon) & \cos(Lon) & 0 \\ \cos(Lon)\cos(Lat) & \sin(Lon)\cos(Lat) & \sin(Lat) \end{bmatrix} \end{aligned}$$

Here, $p_{ecef\_tgt}$ is a three-dimensional position vector of the radio wave source in the ECEF coordinate system. Also, $p_{ecef\_sat}$ is a three-dimensional position vector of the satellite in the ECEF coordinate system. Expression (72) does not include a term relating to movement of the origin. It can be said that Expression (72) represents what happens when a relative position vector (which is also a direction vector) representing the relative position of the radio wave source in the ECEF coordinate system as viewed from the satellite is displayed as a component of the DOA coordinate system.

Both the D matrix and the C matrix of the transformation matrix in Expression (72) are configured by a transformation matrix that performs axis exchange and a rotation matrix that performs rotation around an axis. The size of the vector before the transformation does not change even after the transformation by the D matrix and the C matrix. Details of the C matrix will be apparent from a ninth embodiment to be described later.

The DOA positioning processing unit 7 of the positioning device according to the eighth embodiment considers the following minimization problem.

$$\text{find } \chi_t \text{ s.t. } \arg\min_{\chi_t} J_{DOA}(\chi_t) \tag{73}$$

Here, $J_{DOA}$ of the evaluation function to be minimized is expressed by the following expression.

$$J_{DOA}(X_t) := (z_{DOA} - h_{DOA}(X_t))^T R_{DOA}^{-1} (z_{DOA} - h_{DOA}(X_t)) \tag{74}$$

As is Expression (66), Expression (74) can be said to be a problem of the weighted least squares method. The inverse matrix of the error covariance matrix $R_{DOA}$ on the right side of Expression (74) can be interpreted as a weight for handling Azimuth (azimuth angle) and Elevation (elevation angle) equally. The pseudo-inverse matrix method for solving a least squares problem can also be applied to Expression (74).

In the positioning device according to the eighth embodiment, the "presence expected area" in the TDOA-FDOA space is defined by the following procedure. As illustrated in FIG. 19, the center of the "presence expected area" is first determined from a result of coarse positioning by the DOA.

The next step in defining the "presence expected area" is to calculate the error covariance matrix ($P_{DOA}$) for DOA coarse positioning. Note that $p_{DOA}$ in the DOA coordinate system in Expression (72) is a vector and is represented by a lowercase p, whereas an error covariance matrix ($P_{DOA}$) of the DOA coarse positioning is a matrix and represented by an uppercase P, and the both are distinguished.

$$P_{DOA} = \{H(X_t, p_{sat2})R_{DOA}^{-1}H^T(X_t, p_{sat2})\}^{-1} \quad (75)$$

Here, H of the matrix is expressed by the following expressions.

$$H(\chi_t, P_{sat2}) = \begin{bmatrix} \nabla_{\chi_t} Az(\chi_t, p_{sat2}) \\ \nabla_{\chi_t} El(\chi_t, p_{sat2}) \end{bmatrix} = \overbrace{[\nabla_{p_t} Az(p_t, p_{sat2}), \nabla_{p_t} El(p_t, p_{sat2})]^T}^{L} \overbrace{\begin{bmatrix} \frac{\partial p_t}{\partial Lon_t} & \frac{\partial p_t}{\partial Lat_t} \end{bmatrix}}^{E^T} \quad (76)$$

∇ (nabla) appearing in an element of the L matrix of Expression (76) is given as a vector having a partial differential operator as a vertex as follows.

$$\nabla_{p_t} Az(p_t, p_{sat2}) = \left[\frac{\partial Az}{\partial x}, \frac{\partial Az}{\partial y}, \frac{\partial Az}{\partial z}\right]^T \quad (77)$$

$$\nabla_{p_t} El(p_t, p_{sat2}) = \left[\frac{\partial El}{\partial x}, \frac{\partial El}{\partial y}, \frac{\partial El}{\partial z}\right]^T \quad (78)$$

Each element of the $E^T$ matrix in Expression (76) can be written down as follows:

$$\frac{\partial p_t}{\partial Lon_t} = \frac{\partial}{\partial Lon_t}\begin{bmatrix} R_E\cos(Lon_t)\cos(Lat_t) \\ R_E\sin(Lon_t)\cos(Lat_t) \\ R_E\sin(Lat_t) \end{bmatrix} = R_E\begin{bmatrix} -\sin(Lon_t)\cos(Lat_t) \\ \cos(Lon_t)\cos(Lat_t) \\ 0 \end{bmatrix} \quad (79)$$

$$\frac{\partial p_t}{\partial Lat_t} = \frac{\partial}{\partial Lat_t}\begin{bmatrix} R_E\cos(Lon_t)\cos(Lat_t) \\ R_E\sin(Lon_t)\cos(Lat_t) \\ R_E\sin(Lat_t) \end{bmatrix} = R_E\begin{bmatrix} -\cos(Lon_t)\sin(Lat_t) \\ -\sin(Lon_t)\sin(Lat_t) \\ \cos(Lat_t) \end{bmatrix} \quad (80)$$

The next procedure for defining the "presence expected area" is to create an error covariance matrix ($P_{TDFD}$) of the TDFD area from the error covariance matrix ($P_{DOA}$) of the DOA coarse positioning. The error covariance matrix ($P_{TDFD}$) of the TDFD area can be expressed by the following expression.

$$P_{TDFD} = R_{TDFD} + M(X_t, p_{sat2})P_{DOA})M^T(X_t, p_{sat2}) \quad (81)$$

However, M of the transformation matrix in Expression (81) is expressed by the following expression.

$$M(\chi_t, p_{sat2}) = \overbrace{[\nabla_{p_t} TDOA(p_t, p_{sat2}), \nabla_{p_t} FDOA(p_t, p_{sat2})]^T}^{N} \overbrace{\begin{bmatrix} \frac{\partial p_t}{\partial Lon_t} & \frac{\partial p_t}{\partial Lat_t} \end{bmatrix}}^{E^T} \quad (82)$$

Each element of the N matrix in Expression (82) can be written down as follows.

$$\nabla_{p_t} TDOA(p_t, p_{sat2}) = \frac{1}{c}\left\{\frac{1}{\|p_t - p_{s1}\|}(p_t - p_{s1}) - \frac{1}{\|p_t - p_{s2}\|}(p_t - p_{s2})\right\} \quad (83)$$

$$\nabla_{p_t} FDOA(p_t, p_{sat2}) = \frac{1}{\lambda}\left\{\frac{v_{s1}}{\|p_t - p_{s1}\|} - \frac{v_{s1}^T(p_t - p_{s1})}{\|p_t - p_{s1}\|^3}(p_t - p_{s1})\right\} - \frac{1}{\lambda}\left\{\frac{v_{s2}}{\|p_t - p_{s2}\|} - \frac{v_{s2}^T(p_t - p_{s2})}{\|p_t - p_{s2}\|^3}(p_t - p_{s2})\right\} \quad (84)$$

As described above, in the TDOA-FDOA space illustrated in FIG. 19, the "presence expected area" is indicated by an ellipse. The ellipse representing the "presence expected area" can be defined by the following inequality in quadratic form using the error covariance matrix ($P_{TDFD}$) of the TDFD area of Expression (81).

$$\left(z_{TDFD} - \begin{bmatrix} TDOA_{DOA} \\ FDOA_{DOA} \end{bmatrix}\right)^T P_{TDFD}^{-1}\left(z_{TDFD} - \begin{bmatrix} TDOA_{DOA} \\ FDOA_{DOA} \end{bmatrix}\right) < \gamma^2 \quad (85)$$

It can be said that the error covariance matrix ($P_{TDFD}$) of the TDFD area is an error covariance matrix (hereinafter referred to as an "overall error covariance matrix") related to the entire error assumed by the present disclosure technology. Here, $TDOA_{DOA}$ and $FDOA_{DOA}$ are TDOA and FDOA calculated from the result of coarse positioning by DOA, and are the center coordinates of the "presence expected area". γ on the right side of Inequality (85) is a design parameter that determines the size of the ellipse. Among the observation values, the $z_{TDFD}$ of the observation value satisfying Inequality (85) is expected to be a correct value that is not affected by the ambiguity.

Expressions (55) to (84) described above are expressions required in the processing of the DOA positioning processing unit 7 illustrated in steps ST22*a* to ST22*d* in FIG. 20. In particular, the calculation of the error covariance matrix ($P_{TDFD}$) Of the TDFD area indicated by Expression (81) is performed in step (ST22*d*) of calculating the error covariance matrix. Furthermore, the calculation of the left side of Inequality (85) is calculation in the residual square form performed for each observation value ($z_{TDFD}$), and is performed in the step (ST22*f*) of calculating the residual square form.

The ambiguity handling unit 8 according to the eighth embodiment selects a positioning point included in the "presence expected area" expressed in Inequality (85) among the plurality of positioning points calculated by the TDFD positioning processing unit 14, and outputs a positioning result with the selected value as the most likely positioning point p.

Figure 21A:
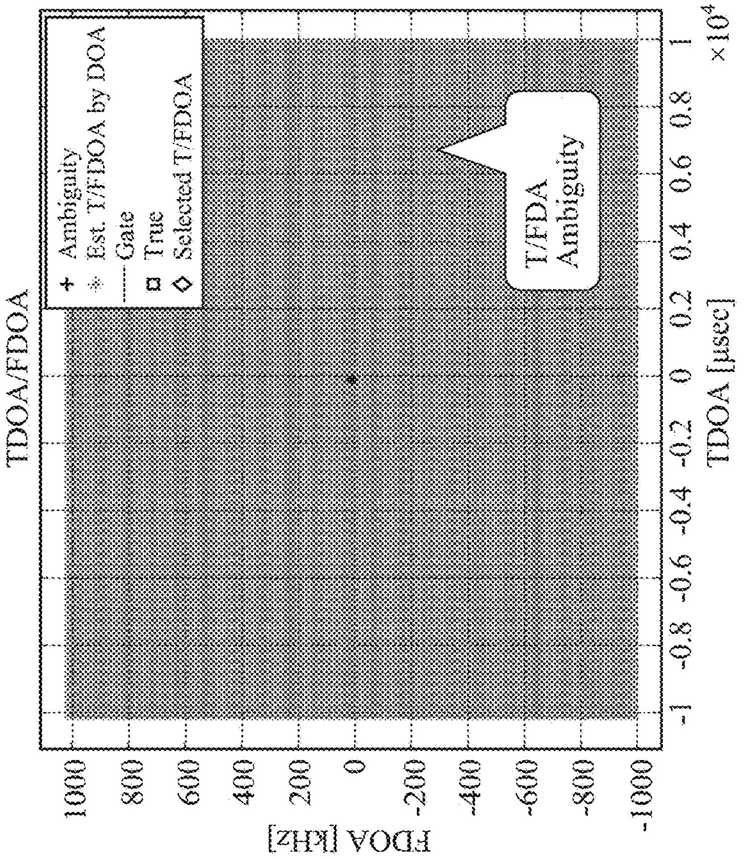
FIG. 21A is a graph plotting positioning points in a TDOA-FDOA space.
Figure 21B:
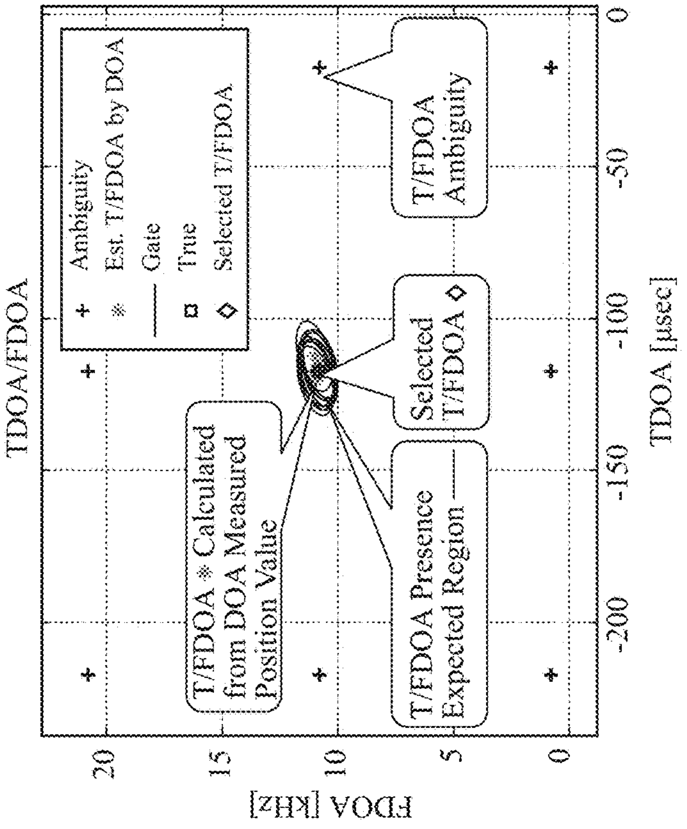
FIG. 21B is a graph (enlarged version) plotting positioning points in the TDOA-FDOA space.

FIG. 21A is a graph plotting positioning points in a TDOA-FDOA space. FIG. 21B is a graph (enlarged version) plotting positioning points in the TDOA-FDOA space. FIGS. 21A and 21B illustrate a state in which positioning is attempted 10 times. FIGS. 21A and 21B illustrate a state in which many ambiguities are generated and a state in which the true value of positioning is included in the "presence expected area".

Figure 22B:
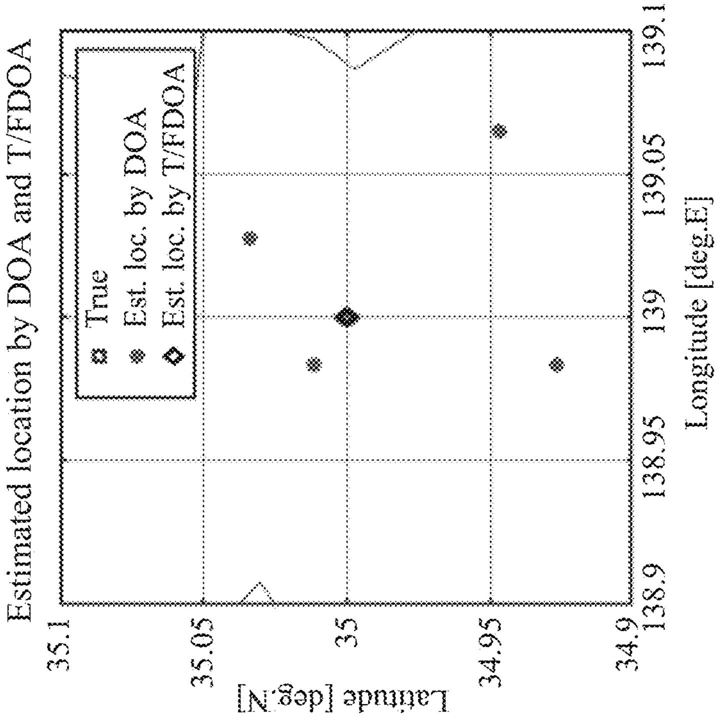
FIG. 22B is a plot (enlarged version) on a map comparing a variation in positioning by DOA and a variation in positioning by the TDFD.
Figure 22A:
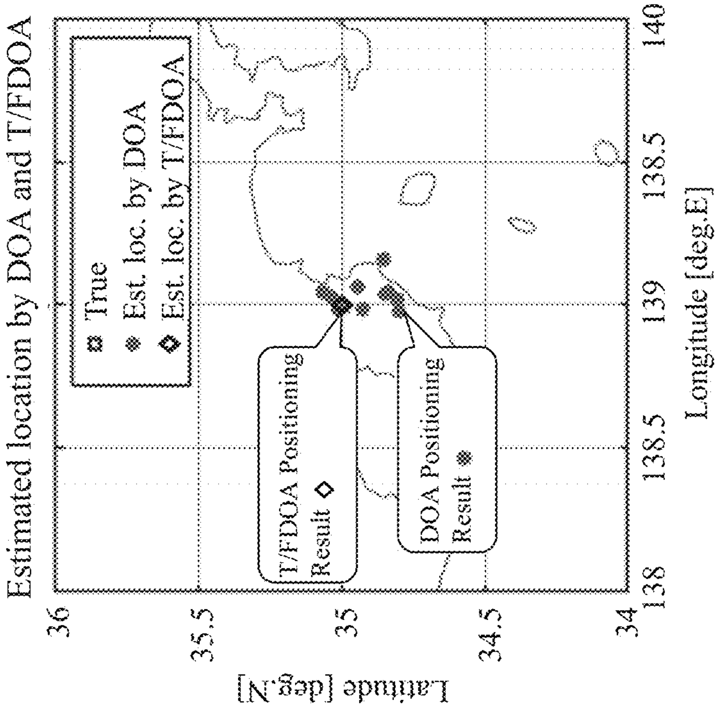
FIG. 22A is a plot on a map comparing a variation in positioning by DOA and a variation in positioning by TDFD.

FIG. 22A is a plot on a map comparing a variation in positioning by DOA and a variation in positioning by TDFD. FIG. 22B is a plot (enlarged version) on a map comparing a variation in positioning by DOA and a variation in positioning by the TDFD. In FIG. 22, positioning by the TDFD is a result of determination that the positioning is included in the "presence expected area" expressed in Inequality (85). FIGS. 22A and 22B illustrate a state in which 10 times of trial of positioning by DOA and times of trial of positioning by TDFD are performed. As illustrated in FIG. 22, positioning of DOA is distributed more widely than positioning of TDFD. Due to this variation, the positioning of DOA is referred to as coarse positioning, and positioning of TDFD is referred to as fine positioning.

The positioning device according to the eighth embodiment employs the "presence expected area" expressed in Inequality (85) instead of Expressions (44) and (45) used by the TDOA range calculating unit 15 according to the sixth embodiment and Expressions (51) and (52) used by the FDOA range calculating unit 16 according to the seventh embodiment.

Since the positioning device according to the eighth embodiment has the above-described configuration, in addition to the effects described in the above-described embodiments, there is an effect that the "presence expected area" can be calculated systematically and the ambiguity can be eliminated.

Ninth Embodiment

In a case where the positioning target is a ship, the positioning device according to the present disclosure technology may be devised in consideration of a measurement error caused by movement and oscillation of the ship. A positioning device according to the ninth embodiment has a configuration capable of selecting a measured position value in consideration of a measurement error caused by movement and oscillation of the ship.

The positioning device according to the ninth embodiment introduces a "ground surface coordinate system" on the basis of the position (anchor point) of the ship present on the ground surface in order to consider the movement and oscillation of the ship. FIG. 23 is a schematic diagram illustrating an ECEF coordinate system and a ground surface coordinate system. As illustrated in FIG. 23, in the ground surface coordinate system, an axis from the ship to the north is an $x_{surf}$ axis, an axis from the ship to the east is a $y_{surf}$ axis, and an axis orthogonal to the $x_{surf}$ axis and the $y_{surf}$ axis is a $z_{surf}$ axis. However, it is assumed that the ship is neither at the North Pole nor at the South Pole where the concept of the north direction on the surface of the earth disappears. The ECEF coordinate system is a right hand system, but the ground surface coordinate system is a left hand system. Since the ground surface coordinate system is a left hand system, the ground surface coordinate system is different from an LSR coordinate system (Local Space Rectangular System).

The conversion from the ground surface coordinate system to the ECEF coordinate system is expressed by the following expressions.

$$x_{ecef} = C^{-1} x_{surf} \tag{86}$$

$$\begin{aligned}
\text{wherein } C^{-1} &= \begin{bmatrix} \cos(Lon) & \sin(Lon) & 0 \\ -\sin(Lon) & \cos(Lon) & 0 \\ 0 & 0 & 1 \end{bmatrix}^{-1} \begin{bmatrix} \cos(Lat) & 0 & \sin(Lat) \\ 0 & 1 & 0 \\ -\sin(Lat) & 0 & \cos(Lat) \end{bmatrix}^{-1} \begin{bmatrix} 0 & 0 & 1 \\ 0 & 1 & 0 \\ 1 & 0 & 0 \end{bmatrix}^{-1} \\
&= \begin{bmatrix} \cos(Lon) & \sin(Lon) & 0 \\ -\sin(Lon) & \cos(Lon) & 0 \\ 0 & 0 & 1 \end{bmatrix}^{T} \begin{bmatrix} \cos(Lat) & 0 & \sin(Lat) \\ 0 & 1 & 0 \\ -\sin(Lat) & 0 & \cos(Lat) \end{bmatrix}^{T} \begin{bmatrix} 0 & 0 & 1 \\ 0 & 1 & 0 \\ 1 & 0 & 0 \end{bmatrix}^{T} \\
&= C^{T} \\
&= \begin{bmatrix} -\cos(Lon)\sin(Lat) & -\sin(Lon) & \cos(Lon)\cos(Lat) \\ -\sin(Lon)\sin(Lat) & \cos(Lon) & \sin(Lon)(\cos(Lat) \\ \cos(Lat) & 0 & \sin(Lat) \end{bmatrix}
\end{aligned}$$

As does Expression (72), Expression (86) includes no term relating to movement of the origin. It can also be said that Expression (86) indicates what would be done if a relative position vector in the ground surface coordinate system was displayed as a component of the ECEF coordinate system.

Strictly speaking, there is a difference that the concept of the distance in the ground surface coordinate system is on the basis of movement constrained to the ground surface, whereas the concept of the distance in the ECEF coordinate system is a linear distance not constrained to the ground surface. Furthermore, since the earth is not a strict sphere, the radius of curvature in the prime vertical and the radius of curvature in the meridian are considered when more accurate calculation is performed.

The positioning device according to the ninth embodiment performs processing on the basis of two assumptions. The first assumption is that a mobile object such as a ship as a positioning target moves in parallel with an $x_{surf}$-$y_{surf}$ plane of the ground surface coordinate system. The second assumption is that the ship oscillates in the $z_{surf}$ direction of the ground surface coordinate system due to the influence of waves.

The velocity associated with the movement and oscillation of the ship is represented by the following symbols.

$$\delta v_{surf} = [\delta v_{surf\_x}, \delta v_{surf\_y}, \delta v_{surf\_z},]^T \tag{87}$$

In general, the Greek letter δ represents "minute", "difference", or "error". Since the velocity associated with the movement and oscillation of the ship is a minute error with respect to the velocity of the satellite, the Greek letter δ is used for the velocity (δv) associated with the movement and oscillation of the ship.

The influence on the FDOA (δFDOA) exerted by the velocity (δv) associated with the movement and oscillation of the ship is derived as follows from Expression (58) indicating the FDOA.

$$\begin{aligned} \delta FDOA(p_t, p_{sat2}, v_{sat2}) &= \frac{1}{\lambda}\left\{\frac{\left(v_{s1} + C^{-1}\delta v_{surf}\right)^T (p_t - p_{s1})}{\|p_t - p_{s1}\|} - \frac{\left(v_{s2} + C^{-1}\delta v_{surf}\right)^T (p_t - p_{s2})}{\|p_t - p_{s2}\|}\right\} - \\ &\quad \frac{1}{\lambda}\left\{\frac{v_{s1}^T (p_t - p_{s1})}{\|p_t - p_{s1}\|} - \frac{v_{s2}^T (p_t - p_{s2})}{\|p_t - p_{s2}\|}\right\} \\ &= \frac{1}{\lambda}\left(C^{-1}\delta v_{surf}\right)^T\left\{\frac{(p_t - p_{s1})}{\|p_t - p_{s1}\|} - \frac{(p_t - p_{s2})}{\|p_t - p_{s2}\|}\right\} \end{aligned}$$

The error variance value ($\sigma^2_{FDOA\_mv}$) of FDOA generated by the velocity (δv) accompanying the movement and oscillation of the ship can be obtained as an expected value of the square of δFDOA.

$$\begin{aligned} \sigma^2_{FDOA\_mv} &= E\{\delta FDOA^2(p_t, p_{sat2}, v_{sat2})\} \\ &= \frac{1}{\lambda^2}\left\{\frac{(p_t - p_{s1})}{\|p_t - p_{s1}\|} - \frac{(p_t - p_{s2})}{\|p_t - p_{s2}\|}\right\}^T C^T \overbrace{E\{\delta v_{surf}\delta v_{surf}^T\}}^{P_{v\_surf}} C\left\{\frac{(p_t - p_{s1})}{\|p_t - p_{s1}\|} - \frac{(p_t - p_{s2})}{\|p_t - p_{s2}\|}\right\} \\ &= \frac{1}{\lambda^2}\left\{\frac{(p_t - p_{s1})}{\|p_t - p_{s1}\|} - \frac{(p_t - p_{s2})}{\|p_t - p_{s2}\|}\right\}^T C^T P_{v\_surf} C\left\{\frac{(p_t - p_{s1})}{\|p_t - p_{s1}\|} - \frac{(p_t - p_{s2})}{\|p_t - p_{s2}\|}\right\} \end{aligned} \tag{89}$$

wherein $$P_{v\_surf} := E\{\delta v_{surf}\delta v_{surf}^T\}$$

Here, $P_{v\_surf}$ may be obtained by a statistical method or may be given as a setting parameter.

The error covariance matrix of the FDOA caused by the velocity (δv) accompanying the movement and oscillation of the ship is given by the following expression.

$$P_{TDFD\_mv} := \mathrm{diag}\{0, \sigma^2_{FDOA\_mv}\} \tag{90}$$

Instead of Expression (81) of the eighth embodiment, the positioning device according to the ninth embodiment regards a matrix ($p_{TDFD}$) obtained by the following expression as an overall error covariance matrix.

$$P_{TDFD} = R_{TDFD} + M(\chi_t, p_{sat2})P_{DOA}M^T(\chi_t, p_{sat2}) + \overbrace{P_{TDFD\_mv}}^{\text{Added in ninth embodiment}} \tag{91}$$

The "presence expected area" according to the ninth embodiment can be defined by applying the overall error covariance matrix ($P_{TDFD}$) obtained by Expression (91) to Inequality (85).

Figure 24:
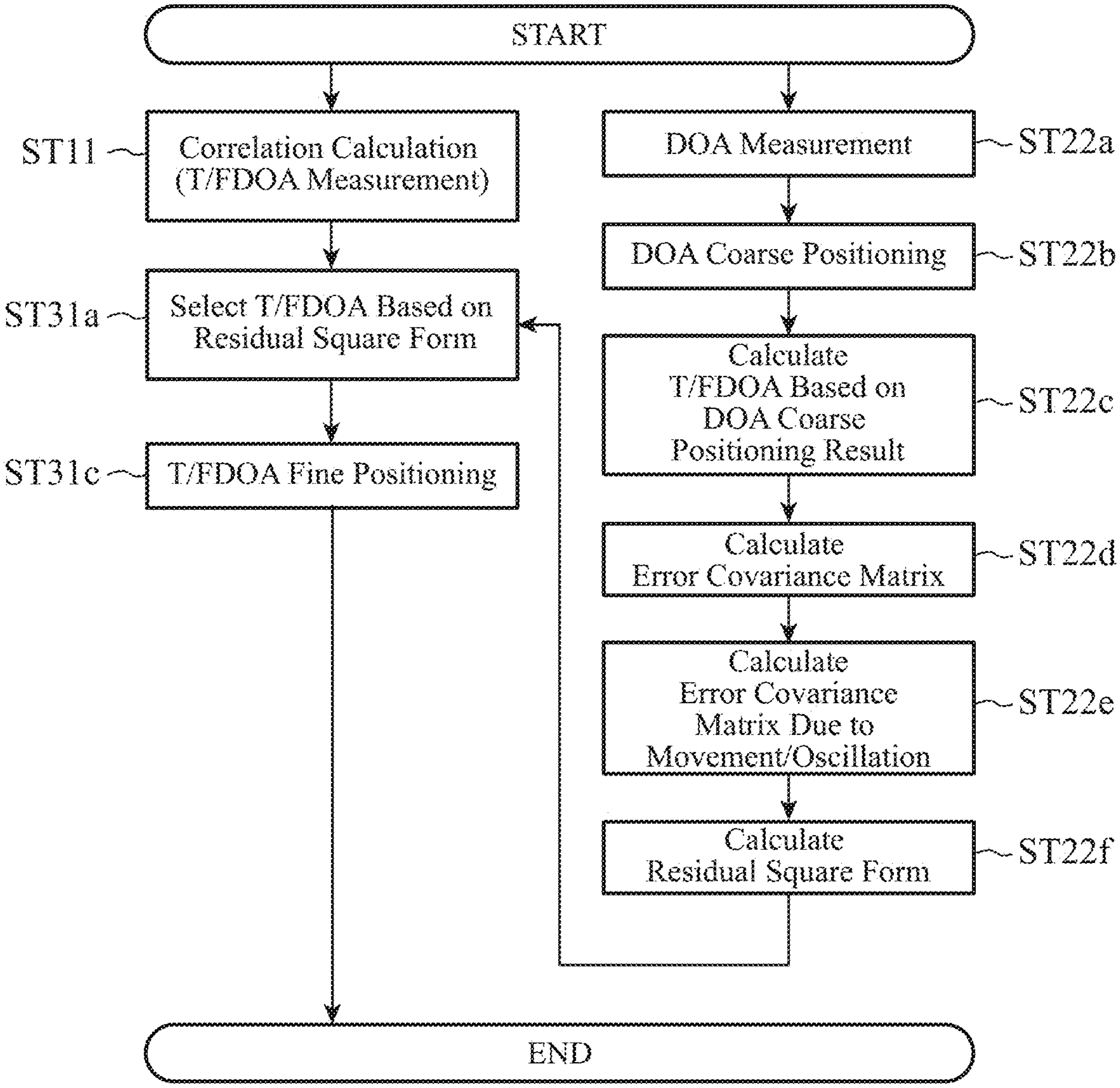
FIG. 24 is a flowchart illustrating a processing flow of a positioning device according to a ninth embodiment.

FIG. 24 is a flowchart illustrating a processing flow of the positioning device according to the ninth embodiment. When FIG. 20 according to the eighth embodiment is compared with FIG. 24 according to the ninth embodiment, there is only one difference. In addition to the processing flow according to the eighth embodiment, step ST22*e* of calculating an error covariance matrix due to movement and oscillation is newly added to the processing flow of the positioning device according to the ninth embodiment. Expressions (86) to (90) described in the ninth embodiment are expressions required in step ST22*e* for calculating an error covariance matrix due to movement and oscillation.

In the positioning device according to the ninth embodiment, in addition to the configuration of the positioning device according to the eighth embodiment, the error covariance matrix of FDOA generated by the velocity (δv) accompanying movement and oscillation of the ship is added in the calculation of the overall error covariance matrix.

Since the positioning device according to the ninth embodiment has the above-described configuration, in addition to the effects described in the above-described embodiments, there is an effect that the "presence expected area" can be calculated systematically and the ambiguity can be eliminated in consideration of a measurement error caused by movement and oscillation of the ship.

Tenth Embodiment

A positioning device according to a tenth embodiment is a modification of the positioning device according to the eighth embodiment. The positioning device according to the eighth embodiment is a positioning device that performs positioning from information of TDOA and FDOA using at least two satellites. When the number of satellites that can be used for positioning is three or more, positioning can be performed only with TDOA information. The positioning device according to the tenth embodiment performs positioning only with TDOA information when the number of satellites that can be used for positioning is three or more.

Note that, hereinafter, for the sake of simplicity, only parts of the mathematical expressions for the three satellites #1, #2, and #3 are described, but the mathematical expressions can be generalized and applied even if the number of satellites increases.

Figure 25:
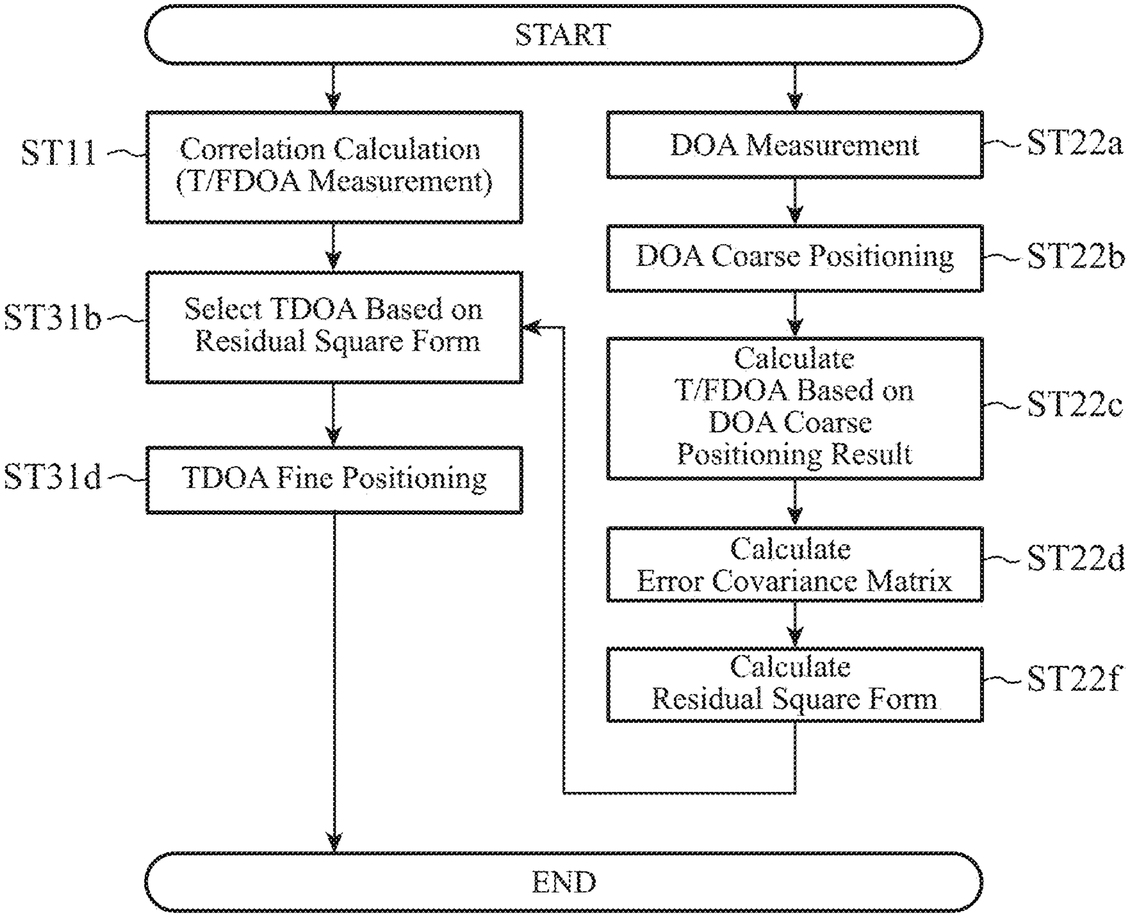
FIG. 25 is a flowchart illustrating a processing flow of a positioning device according to a tenth embodiment.

FIG. 25 is a flowchart illustrating a processing flow of the positioning device according to the tenth embodiment. When FIG. 20 according to the eighth embodiment is compared with FIG. 25 according to the tenth embodiment, there is almost no difference therebetween. A part indicated as "T/FDOA" in the processing flow of the positioning device according to the eighth embodiment is indicated as "TDOA" in the processing flow of the positioning device according to the tenth embodiment.

Expression (56) representing the true value described in the eighth embodiment is as follows in the tenth embodiment.

$$h_{TDOA}(p_t, p_{sat2}) = \begin{bmatrix} TDOA_{12}(p_t, p_{sat2}) \\ TDOA_{23}(p_t, p_{sat2}) \\ \vdots \end{bmatrix} \quad (92)$$

Note that each element on the right side of Expression (92) is expressed in Expressions (1), (3), and the like.

Expression (59) representing the error covariance matrix ($R_{TDFD}$) described in the eighth embodiment is as follows in the tenth embodiment.

$$\begin{aligned} E\{n_{TDOA} n_{TDOA}^T\} &= \mathrm{diag}\{\sigma_{TDOA\_12}^2, \sigma_{FDOA\_23}^2, \ldots\} \\ &= :R_{TDOA} \end{aligned} \quad (93)$$

The positioning device according to the eighth embodiment obtains the "presence expected area" in the TDOA-FDOA space illustrated in FIG. 19. The positioning device according to the tenth embodiment cannot use the information of FDOA, but is only required to obtain the "presence expected area" in the TDOA space including $TDOA_{12}$, $TDOA_{23}$, . . . instead of the TDOA-FDOA space. Inequality (85) representing the presence expected area described in the eighth embodiment is as follows in the tenth embodiment.

$$\left(z_{TDOA} - \begin{bmatrix} TDOA_{12\_DOA} \\ TDOA_{23\_DOA} \\ \vdots \end{bmatrix}\right)^T P_{TDOA}^{-1} \left(z_{TDOA} - \begin{bmatrix} TDOA_{12\_DOA} \\ TDOA_{23\_DOA} \\ \vdots \end{bmatrix}\right) < \gamma^2 \quad (94)$$

Since the positioning device according to the tenth embodiment has the above-described configuration, positioning can be performed only with TDOA information in a case where the number of usable satellites is three or more, and the effects described in the above-described embodiments are obtained.

Note that combinations of the individual embodiments, modifications of any components of the individual embodiments, or omissions of any components in the individual embodiments are possible.

INDUSTRIAL APPLICABILITY

The present disclosure technology can be applied to satellite positioning and the like, and has industrial applicability.

REFERENCE SIGNS LIST

1: receiving antenna, 2: receiving unit (receiver), 3: cross-correlation processing unit (cross-correlation processor), 4: TDOA calculating unit (TDOA calculator), 5: TDOA positioning processing unit (TDOA positioning processor), 6: DOA estimation processing unit (DOA estimation processor), 7: DOA positioning processing unit (DOA positioning processor), 8: ambiguity handling unit (ambiguity handler), 9: positioning result output, 10: centroid value calculating unit (centroid value calculator), 11: FDOA calculating unit (FDOA calculator), 12: FDOA positioning processing unit (FDOA positioning processor), 13: TDFD calculating unit (TDFD calculator), 14: TDFD positioning processing unit (TDFD positioning processor), 15: TDOA range calculating unit (TDOA range calculator), 16: FDOA range calculating unit (FDOA range calculator), 17: TDFD range calculating unit (TDFD range calculator), 100: processor, 101: memory, 102: display

What is claimed is:

1. A positioning device, comprising:

a TDFD calculator to calculate a TDOA and an FDOA by referring to a peak of cross-correlation;

a TDFD positioning processor to perform TDOA positioning and FDOA positioning by referring to the TDOA and the FDOA;

a DOA estimation processor to estimate a DOA from a reception signal received by an array antenna of at least one satellite;

a DOA positioning processor to perform DOA positioning by referring to the DOA;

a TDFD range calculator to set a presence expected area in a TDOA-FDOA space by referring to a result of the DOA positioning processor and a variance of measurement errors; and an ambiguity handler to select one included in the presence expected area from among a plurality of positioning results calculated by the TDFD positioning processor, wherein the presence expected area is represented by an inequality in quadratic form defined from an overall error covariance matrix.

2. The positioning device according to claim 1, wherein the overall error covariance matrix includes terms of an error covariance matrix of an FDOA caused by a velocity associated with movement or oscillation of a ship.

* * * * *